US006643666B1

United States Patent
Kernz

(10) Patent No.: US 6,643,666 B1
(45) Date of Patent: *Nov. 4, 2003

(54) APPARATUS AND METHOD FOR ACCESSING A COIN IMAGE COMPILATION

(76) Inventor: James J. Kernz, 1052 Evergreen Ct., Perrysburg, OH (US) 43551

( * ) Notice: Subject to any disclaimer, the term of this patent is extended or adjusted under 35 U.S.C. 154(b) by 0 days.

This patent is subject to a terminal disclaimer.

(21) Appl. No.: 10/113,990

(22) Filed: Apr. 1, 2002

Related U.S. Application Data

(60) Continuation-in-part of application No. 10/055,603, filed on Jan. 23, 2002, which is a division of application No. 09/259,189, filed on Feb. 26, 1999, now Pat. No. 6,366,899.
(60) Provisional application No. 60/076,380, filed on Feb. 26, 1998.

(51) Int. Cl.$^7$ .............................. G06F 17/00; G06F 7/00
(52) U.S. Cl. ......................................... 707/104.1; 707/1
(58) Field of Search .............................. 707/1, 10, 102; 345/700, 781; 705/26–27, 37

(56) References Cited

U.S. PATENT DOCUMENTS

| | | | |
|---|---|---|---|
| 4,829,453 A | 5/1989 | Katsuta et al. ............... 382/305 |
| 4,899,392 A | 2/1990 | Merton ....................... 382/136 |
| 5,042,650 A | 8/1991 | Mayer et al. ................. 206/184 |
| 5,111,408 A | 5/1992 | Amjadi ....................... 345/705 |
| 5,133,451 A | 7/1992 | Boyd et al. .................. 206/81 |
| 5,150,792 A | 9/1992 | Munroe ...................... 206/486 |
| 5,220,614 A | 6/1993 | Crain ......................... 382/136 |
| 5,224,176 A | 6/1993 | Crain ......................... 382/136 |
| 5,235,680 A | 8/1993 | Bijnagte ...................... 707/10 |
| 5,263,136 A | 11/1993 | DeAguiar et al. ........... 345/538 |
| 5,494,147 A | 2/1996 | Takahashi et al. .......... 194/328 |
| 5,515,268 A | 5/1996 | Yoda ........................... 705/26 |
| 5,664,115 A | 9/1997 | Fraser ......................... 705/35 |
| 5,740,428 A | 4/1998 | Mortimore et al. ....... 707/104.1 |
| 5,764,235 A | 6/1998 | Hunt et al. .................. 345/428 |
| 5,799,284 A | 8/1998 | Bourquin ..................... 705/26 |
| 5,933,829 A | 8/1999 | Durst et al. .................. 707/10 |
| 5,978,773 A | 11/1999 | Hudetz et al. ............... 705/23 |
| 5,992,752 A | 11/1999 | Wilz, Sr. et al. ......... 235/472.01 |
| 6,058,417 A | 5/2000 | Hess et al. .................. 709/219 |
| 6,068,188 A | 5/2000 | Knowles ................. 235/462.01 |
| 6,076,733 A | 6/2000 | Wilz, Sr. et al. ......... 235/462.01 |
| 6,108,656 A | 8/2000 | Durst et al. .................. 707/10 |
| 6,199,048 B1 | 3/2001 | Hudetz et al. ............... 705/123 |
| 6,243,691 B1 * | 6/2001 | Fisher et al. ................. 705/37 |
| 6,321,992 B1 | 11/2001 | Knowles et al. ........ 235/462.01 |
| 6,345,764 B1 | 2/2002 | Knowles ................ 235/472.01 |
| 6,381,510 B1 * | 4/2002 | Amidhozour et al. ....... 700/130 |
| 6,421,653 B1 * | 7/2002 | May ............................ 705/37 |

FOREIGN PATENT DOCUMENTS

| | | | | |
|---|---|---|---|---|
| EP | 1100030 A1 * | 5/2001 | ........... G06F/17/60 |
| EP | 1178420 A2 * | 2/2002 | ........... G06F/17/60 |

* cited by examiner

*Primary Examiner*—Greta Robinson
*Assistant Examiner*—Susan F. Rayyan
(74) *Attorney, Agent, or Firm*—MacMillan, Sobanski & Todd, LLC

(57) ABSTRACT

A computer system and method for selectively displaying a coin image compilation includes a host computer operatively connected to a storage device for storing the coin image compilation. A remote terminal can connect to the host computer to access the coin image compilation and display selected images from the compilation in any sequence. The method for selectively viewing coin image compilations on the remote terminal includes selecting images of an obverse view, a reverse view, and a holdered view at various degrees of magnification.

30 Claims, 14 Drawing Sheets

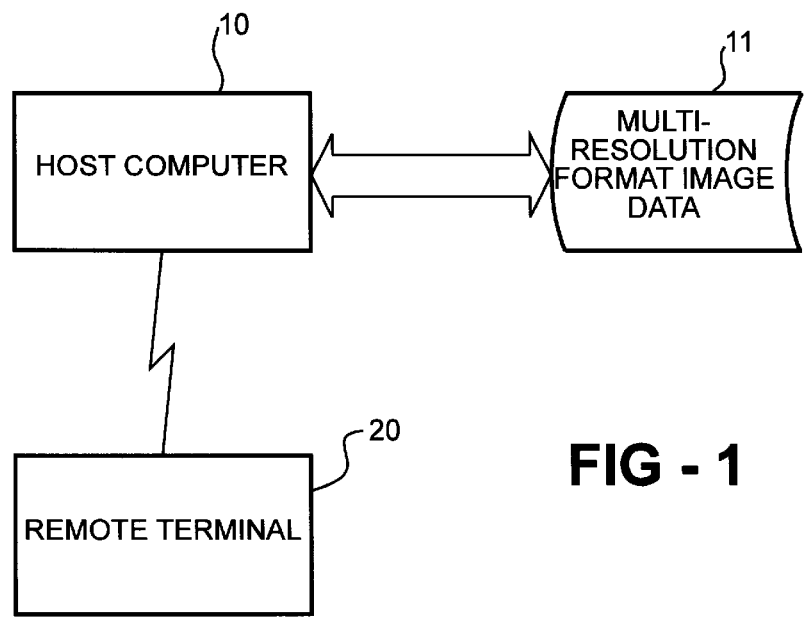
FIG - 1
FIG - 12
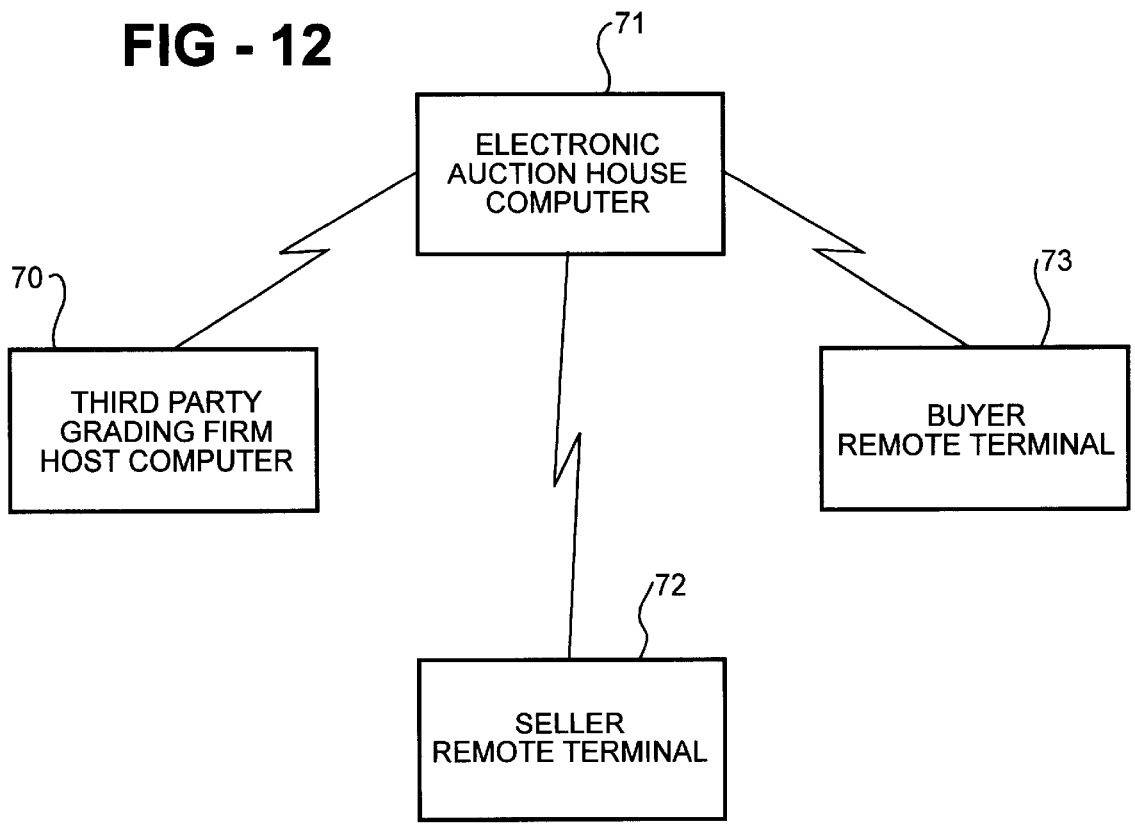

| Reference Numeral | Textual Label |
|---|---|
| 80 | Tamperproof coin case assembly |
| 81 | Retainer |
| 82 | Aperture |
| 83 | Coin |
| 84 | Grading Certificate |
| 85 | Transparent Case |
| 86 | Identifying Indicia |
| | |
| | |

Eye Popping Photo Certified Coins

1914-S Lincoln Cent, PCGS Graded MS64RD
Inspect one of the finest examples of this scarce one cent piece. An absolute gem. Spectacular color with no spots or marks. Low Population with very few graded higher.
PCGS CERT # 2475.64/8297369 .................. $1,950

1936 DDO-2 Lincoln PCGS MS65RED
A wonderful example of this very rare doubled die type 2 cent. A strong strike and blazing luster highlight this rarity. A bit of toning behind Lincoln's head and on the lower left of the reverse from the rim to the wheat stem is all that keeps this beauty from a 66.
PCGS CERT # 92650.65/2862113 ................ $3,699

1893 PROOF BARBER DIME NGC PR68
Tied for finest known example of this early barber dime proof. Heavy cameo with jet black fields. Simply awesome!
NGC CERT # 590292-010 .......................... $6,250

1857 SEATED QUARTER NGC MS65
Superb and original with razor sharp strike and wondrous surfaces. Low population with few graded higher. This one is destined to be a REGISTRY COIN.
NGC CERT # 141985-003 .......................... $4,200

1834 CAPPED BUST QUARTER NGC Proof 67
Finest known razor sharp strike and deeply reflective fields leave no doubt as to its proof status. An incredible coin not only because of the way it looks but also because of how rare the piece is.
NGC CERT # 208114-023 .......................... $125,000

1932-S WASHINGTON QUATER PCGS MS65
An original gem example and very scare this grade. Brilliant with a hint of bluish patina. Pretty!
PCGS CERT # 5792.65/03759476 ................ $5,200

1879 SEATED HALF PCGS MS67
Beautifully toned with razor sharp strike. A must have for the discriminating type coin collector.
PCGS CERT #6361.67/6568449 ................ $8,250

1893-O BARBER HALF PCGS MS65
Mottled dark toning keeps this piece from being graded higher. Very rare and priced to sell.
PCGS CERT # 6466.65/21018468 .............. $7,500

1938 WALKING LIBERTY HALF NGC MS67
A blast white gem with exceptional luster. Outstanding!
NGC CERT # 273763-009 .......................... $430

1938 PROOF WALKING LIBERTY HALF NGC PR66
A bright white gem with exceptional strike. Great hand detail makes this half a must have.
NGC CERT # 1633166-014 ........................ $800

1885-S PCGS MS65 PROOFLIKE MORGAN DOLLAR
This Morgan is extremely rare in proof like, and even more so in high grade. PCGS has graded only 7 coins at this level with a single coin graded higher...there is a single DMPL coin graded. Super flashy mirrors with a bit of frost and MS65/66 surfaces.
PCGS CERT # 7185.65/5257517 ................ $4,900

1904-O PCGS MS66 DEEP MIRROR PL MORGAN
PCGS has graded only a single coin higher in the past 13+ years of grading and not many exist at this lofty level...very rare and very PQ. You will not find a nicer 04-O in 66 DMPL in any holder. Super PQ with very deep mirrors.
PCGS CERT # 97293.66/2846730 ............... $3,295

1904-S PCGS MS65 PROOFLIKE MORGAN DOLLAR
Terrific eye appeal with the slightest amount of edge toning. A choice addition to any MS65 Morgan collection.
PCGS CERT # 7295.65/21006242 .............. $6,750

91
92
Rare Coin Emporium
1234 Main Street
Anyplace, USA

90

Specializing in Photo Certified Encapsulated Coins

Visit http://www.photo-cert.com to view
Super High Resolution Trusted Coin Imagery

FIG - 14

APPARATUS AND METHOD FOR ACCESSING A COIN IMAGE COMPILATION

CROSS-REFERENCE TO RELATED APPLICATION

This application is a continuation-in-part of co-pending U.S. patent application Ser. No. 10/055,603, filed Jan. 23, 2002, which is a divisional of U.S. patent application Ser. No. 09/259,189, filed Feb. 26, 1999 now U.S. Pat. No. 6,366,899, which is a continuation of U.S. Provisional Application Serial No. 60/076,380, filed Feb. 26, 1998.

BACKGROUND OF THE INVENTION

The present invention relates generally to an apparatus and method for exchanging numismatic material. More specifically, the present invention relates to an apparatus and method for creating a virtual exchange in which buyers and sellers can offer and examine collectable coins including items considered to be exonumia such as tokens, medals and the like.

The art of numismatics, more commonly known as coin collecting, is one of the world's oldest hobbies. People have exchanged collectible coins for almost as long as man has used them as a medium of exchange. In the late nineteenth century, the practice of coin collecting became so widespread that an active commercial market developed where an informal network of dealers bought and sold coins to interested individuals.

Recently, as the prices of rare coins has increased, collectable coins have become a medium of investment. This has produced dramatic changes in the way business is conducted within the numismatic marketplace.

One of these changes is the widespread use of the Sheldon incremental coin grading scale. Historically, an expression of a coin's state of preservation or its "grade" was limited to a descriptive range beginning with a grade of GOOD and ending with a grade of UNCIRCULATED. The succession of traditional descriptive grades read as follows: good (G); very good (VG); fine (F); very fine (VF); extremely fine (EF); about uncirculated (AU); uncirculated (UNC) or mint state (MS). In contrast, when using the Sheldon coin grading scale, a coin's state of preservation is further defined on a numeric scale in which "1" represents the worst possible condition and "70" represents the best possible state of preservation. Widespread adoption of Sheldon's expanded method for grading collectible coins has intensified the standards of grading. Methods, systems, and mechanisms for objectively grading and identifying coins are described in the U.S. Pat. Nos. 4,899,392; 5,220,614; 5,224,176; and 5,494,147, for example.

A coin's grade contributes greatly to its market value. In many instances, a very slight difference in grade can correlate to a large difference in value. As a general rule, the market value of a collectible coin tends to increase non-linearly with incremental increases in grade. Consequently, a coin which exhibits a high state of preservation, that is to say, a pristine coin that remains MINT STATE having never circulated will likely command a market price many times higher than the same coin grading AU58. During day to day commerce, a coin's state of preservation decreases due to normal handling by the public. A drop in grade from MS66 to EF45 can at times translate to a non-linear reduction in market value extending throughout the full range of grades down to G04 and below. For certain specimens, uncirculated examples may be so scarce that less than a few are known to exist. In these rare instances, as much as 90% of the coin's potential market value resides in being classified as MINT STATE (MS60 through MS70). For extremely rare and highly sought after coins, a difference of only a few points within the uncirculated category can effect market value by thousands of dollars.

Another change that greatly influenced the numismatic marketplace was the introduction of encapsulated coins graded by an independent third party. As the numismatic marketplace began to use the expanded Sheldon grading scale, concern regarding the reliability of grading within the market increased. Market participants soon learned that a coin grading MS65 may have a market value many times greater than the same coin grading MS64, although the distinction may not be readily discernible to the untrained eye.

A coin purchased by a dealer as MS64 might be sold to a collector as MS65 affording the dealer a considerable profit. Due to the absence of a true method for certifying a coin's grade, the average collector was often victimized by product misrepresentation. Industry leaders were deeply concerned that without consistent grading the rare coin market would suffer and likely diminish overall. In 1985, a group of notable coin experts banded together and formulated a plan to create a professional third-party coin grading service. The advent of the third-party appraisal of a coin's physical condition, backed by a guarantee, and a national network of coin dealers provide a reliable form of consumer protection. In addition, the Professional Coin Grading Service popularized a method of encapsulation that gave the rare coin consumer added transactional security.

A case of the type commonly used to encapsulate coins is described in the U.S. Pat. No. 5,042,650 to Mayer and Hall. This patent describes a rigid plastic coin case having two interlocking plastic plates ultrasonically sealed together to form a tamper proof and protective enclosure for collectible coins.

The popularity of third party grading coupled with the practice of encapsulating only authentic coins within tamper proof plastic holders revolutionized the numismatic market. Authenticated coins, encapsulated in plastic and certified as to grade soon began to move in the marketplace as almost fungible commodities. At present, it is not uncommon for buyers and sellers to consummate trades without the buyer having physically examined the coin. In fact, this marketplace is established to the extent that near real time quotes are available with relative price spreads (BID vs. ASK) for all but the most rare and unique specimens.

Despite these developments, prudent buyers who invest significant sums on individual coins typically do not purchase expensive pieces sight-unseen. While traded sight unseen, coins have too much individual identity to be a fungible commodity. Thus, the coin shows that are organized on an almost weekly basis around the United States, remain the forum where many collectors examine coins before committing to a purchase. A coin show gives both dealers and collectors the best opportunity to examine currently available material.

The development of easily accessible electronic commerce, such as through the Internet, was quickly adopted by individual coin collectors in the sight-unseen coin market. In addition to significantly increasing the size of the marketplace and eliminating the time lag that exists in print publications, electronic commerce permits individual coin collectors to act as dealers whenever it suits them. Historically, individuals opting to participate within the coin market as dealers had to pay a high price for admission.

Initial inventory, advertising expenses, direct mailing costs, travel, lodging and a storefront all contributed to high startup costs.

Alternatively, by using electronic commerce, any collector can become a part-time coin dealer selling coins he owns via any of the readily available on-line auction services, for example. Such auction services and even more informal bulletin boards permits any collector to sell his coins at near retail level to another collector rather than to an established dealer at a considerable discount. As a consequence, an invigorated and rapidly growing sight-unseen coin market has evolved in "cyberspace" and the once clear differentiation between dealer and collector has become blurred.

However, unlike a coin show where one can walk the floor and browse, the nature of the sight-unseen market often impedes a collector's natural tendency to "hunt" for undergraded bargains or "cherrypick" rare die varieties from the inventories of dealers who lack such knowledge. These activities usually require close physical proximity to a plentiful selection of coins, a circumstance that is impossible given the unique logistic nature of the sight-unseen coin market. Furthermore, experienced coin collectors and dealers realize implicitly that the process of accurately grading and pricing a coin depends on careful physical examination. Such examination is usually carried out with the aid of a jeweler's loupe or magnifying glass. The traditional sight-unseen market makes it difficult for new collectors to develop a feeling for how collectable coins are examined, graded and priced. Individual self-reliance with respect to grading rare coins is an absolute necessity for increasing the number of collectors willing to invest in quality coins. Therefore, it would be desirable to offer novice buyers and sellers a more favorable sight-unseen marketplace environment where the exchange of numismatic material sight-unseen could be carried out in a virtual marketplace experience that would present an abundant offering of virtual coins for buyers to carefully examine at will, each coin capable of being inspected interactively as if under simple magnification.

SUMMARY OF THE INVENTION

The present invention concerns a system and method for creating a more robust virtual marketplace for examining coins with linked multiple images of each coin being offered for sale. Such linked multiple images, referred to hereinafter as a coin image compilation, are stored on a host computer system that is remotely accessible. A prospective buyer can access the host computer and review the coin image compilation to examine the visual appearance of any coin he wants to buy.

One aspect of this invention comprises a computer system for selectively displaying a coin image compilation where the coin image compilation comprises a plurality of linked images representing different resolutions of the original image and tiled sub-images of the entire image. This computer system comprises a host computer; a data storage device operatively connected to the host computer for storing the coin image compilation, a remote terminal that can connect to the host computer to access the coin image compilation; a display device connected to the remote terminal; and an input device connected to the remote terminal for selecting for display on the display device from the data storage device a selected image corresponding to a predetermined resolution and number of tiles.

Another aspect of the invention is a computer system for selectively generating coin image compilations. This computer system comprises an HTTP (Hypertext Transfer Protocol) host computer; at least one data storage device operatively connected to the HTTP host computer; data for multiple images of the coin image compilations stored on the at least one data storage device; a remote terminal capable of reading and rendering HTML (Hypertext Markup Language) pages that can connect to the host computer; a processor mounted on the HTTP host computer that generates successive dynamic HTML pages on-the-fly from the data and streams the dynamic HTML pages to the remote terminal as requested by the remote terminal.

Still another aspect of the invention is a method for selectively viewing coin image compilations on a remote terminal connected to a host computer where the coin image compilations comprise images 1, 2, 3, . . . N of an obverse view, a reverse view, and a holdered view, the method comprising the steps of: a) connecting the remote terminal to the host computer; b) querying a database of the coin image compilations on the host computer from the connected remote terminal; c) selecting a coin image compilation from the queried database; d) sending the image 1 of the obverse view, the reverse view, and the holdered view from the host computer to the remote terminal; e) displaying the sent image 1 of the obverse view, the reverse view, and the holdered view at the remote terminal; f) selecting any displayed image; g) requesting one of images 2 through N of the selected image from the host computer; h) sending the requested one of the images 2 through N from the host computer to the remote terminal; i) displaying the sent image at the remote terminal in place of the selected displayed image; and j) repeating steps f) to i) as desired.

Recognizing the important role which third party grading services play within the numismatic market, it should be stated that an object of the present invention is to provide an improved business model for existing third party grading firms where the internal and external deployment of a well developed Numismatic Imaging Protocol such as the Certified Coin Image Compilation disclosed herein may better serve the collective best interests of all market participants.

Accordingly, it is one object of the present invention to provide a well developed Numismatic Imaging Protocol for the numismatic industry where the deployment of such protocol can be used internally within third-party grading firms to increase the productivity and consistency of expert coin graders employed by such firms.

It is generally accepted and appreciated that third party grading firms remain at-arms-length with respect to trading. This restriction ensures that their contribution to the marketplace and their grading practices remain unbiased. In keeping with the spirit of this self imposed market behavior, the present invention if practiced by third-party grading firms can successfully preserve the anonymity of coin owners without departing from the present invention's spirit or scope or limiting its use or practice elsewhere within the market.

Accordingly, it is an object of the present invention to leverage the inherent power of the World Wide Web's distributed content characteristic by providing an apparatus, method and system for Certified Coin Image Compilation whereby the invention's unique graphic layout and coin image presentation can be linked to and displayed simultaneously in conjunction with independent attempts by numismatists to offer coins for sale via the World Wide Web.

Accordingly it is a primary object of the present invention to overcome prior art limitations by providing novel technology that uses network bandwidth efficiently, making it possible for a third party grading firm to present image-rich, responsive Web pages that access high-quality, high resolution data for zooming in on and exposing fine image details of collectable coins having been authenticated, graded and encapsulated by the firm.

It should therefore be stated that another object of the present invention is to provide an improved method for encapsulating collectable coins where the permanent application of a World Wide Web address (URL) to an encapsulated coin's protective case or the addition of like identifying indicia within the rigid plastic protective holders provided by third party grading firms facilitates the utilization of Certified Coin Image Compilations within the virtual numismatic marketplace.

Accordingly, it is another object of the present invention to provide a well developed Numismatic Imaging Protocol for the numismatic industry where the external deployment of such protocol by a third party grading firm leads to a beneficial increase in the overall goodwill and aggregate added value associated with at least one third party grading firm's installed base of encapsulated coins.

Another object of the invention is to provide an apparatus and method for matching remotely located buyers and sellers of numismatic material through the use of a computer system that permits a prospective buyer to select an item of interest and examine it in detail via multiple linked images.

Additionally, it is an object of the present invention to overcome the technical and financial impediments facing numismatists by providing an apparatus, method and system whereby prospective sellers of numismatic material can best present visual and textual information pertaining to their coins without the need to possess HTML coding skills, expensive photographic equipment or access to a Web server.

Accordingly, it is an object of the present invention to provide an apparatus and method for matching buyers and sellers of numismatic material through a data communications network wherein the system offers: readily available online access to a host system containing a plurality of numismatic items; online search capabilities permitting a prospective buyer to select an item of interest based on a plurality of user defined search criteria; displaying the resultant item according to a unique identification number; providing the prospective buyer with a novel, high resolution interactive display defined herein as a Certified Coin Image Compilation.

Accordingly, it is yet another object of the present invention to provide an apparatus and method providing educators, writers, researchers and the like with pertinent numismatic information through a data communications network wherein the system offers: readily available online access to a host system containing a plurality of numismatic items; online search capabilities permitting a researcher to select an item of interest based on a plurality of user defined search criteria; displaying the resultant item according to a unique identification number; providing the numismatic researcher with a novel, high resolution interactive display defined herein as a Certified Coin Image Compilation.

Accordingly, it is another object of the present invention to provide a well developed Numismatic Imaging Protocol for the numismatic industry where the utilization of high resolution visual documentation in conjunction with collectors' offer to sell coins raises in a measurable way transactional efficiency within the coin market.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a block diagram illustrating a remote terminal in contact with a host computer where the host computer is operatively connected to a storage device containing multi-resolution format image data;

FIG. 12 is a block diagram illustrating a host computer connected to an electronic auction house computer for transacting business electronically between buyers and sellers;

FIG. 14 is a numismatic advertisement in accordance with the present invention.

DESCRIPTION OF THE PREFERRED EMBODIMENT

The present invention provides access to linked multiple images of each of a plurality of coins being offered for examination or sale, i.e. a coin image compilation (CIC) for each such coin. When the coin has been certified and encapsulated by an independent third party grading firm, the CIC is known as a Certified Coin Image Compilation (CCIC). It is understood that third party coin grading firms are uniquely positioned within the marketplace, and possess the requisite level of credibility, making them preferred candidates to practice the present invention, but practicing the present invention is in no way limited to third party grading firms. The coin image compilations are provided by a host computer system that is remotely accessible as shown in the FIG. 1. A host computer 10 is operatively connected to a storage device 11. The host computer 10 may be any type of computer as required for a particular level of operation of the invention such as a personal computer, a network server, a Web server, a microcomputer, a workstation, or a network of such computers. The storage device 11 may be any adequate storage device or multiples of devices such as hard disk drives, CD-ROMs, DVDs, etc.

When a prospective buyer (a user) wants to examine a coin, the user connects a remote terminal 20 to the host computer 10 and accesses the coin image compilation of the coin of interest. The remote terminal 20 may be any suitable device such as a dumb terminal, a notebook computer, a personal computer, etc. having sufficient processing and display capabilities in combination with the host computer 10 to access and view coin image compilations according to the present invention.

The remote terminal 20 can be connected to the host computer 10 via any convenient means, such as through a direct connection, a direct wireless connection, a dial-up connection, a full time network connection, an intranet connection, or an Internet connection, or any variation thereof.

The present invention establishes a virtual coin show that combines elements of all the current sight and sight unseen numismatic markets. As at a traditional coin show, collectors and dealers acting as buyers and sellers can browse available coins that are encapsulated and graded (listed in a database), choose a coin of interest (by clicking their mouse), visually examine the coin in detail (by reviewing the images in the coin image compilation), and conclude the transaction. In addition, like the traditional sight unseen market interested parties don't need to travel to browse coins, and any collector can act as a dealer. Further, the present invention permits comparisons between similar coins, which might not be at the same traditional coin show, and simultaneous comparisons between different views of the same coin.

Figure 2:
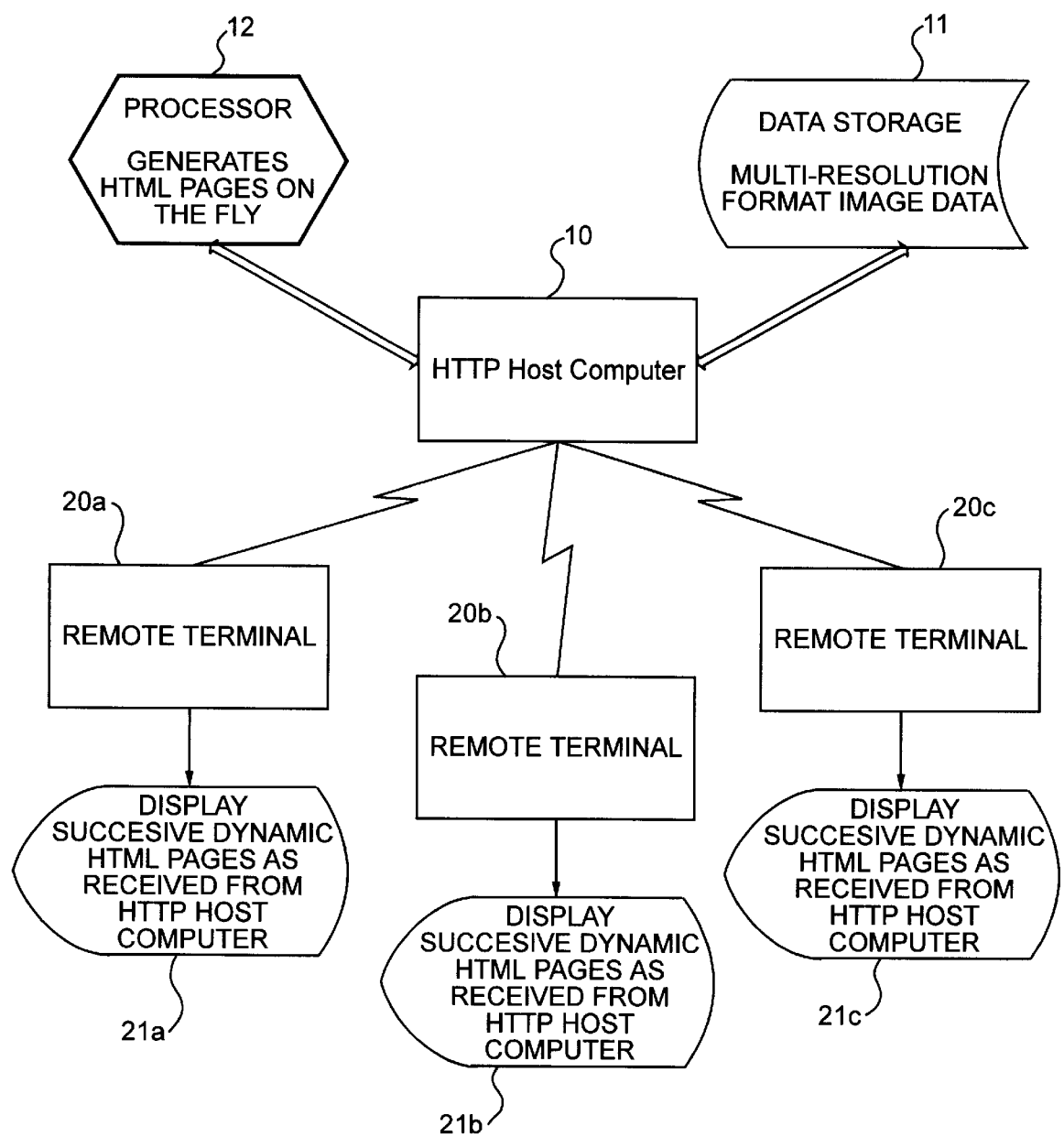
FIG. 2 is a block diagram illustrating an embodiment of the present invention in greater detail where multiple remote terminals are in contact with an HTTP computer that is operatively connected with a data storage device containing multi-resolution format image data and a processor that generates HTML pages on-the-fly using this data.

FIG. 2 illustrates the present invention in greater detail where the host computer 10 is operationally connected to the data storage device 11 and a processor 12. In addition, any number of remote terminals as discussed above represented by 20a, 20b, and 20c can be connected to the host computer 10. In this embodiment, the host computer is an HTTP host computer 10. As used herein, an HTTP computer is any Hypertext Transfer Protocol capable computer as described herein.

The data storage device 11 can be any type of data storage device of the type described above. Each coin image compilation stored on the data storage device 11 must include the data required to generate images of various portions of the coin in various degrees of magnification. Typically, the larger the file size, the higher the resolution of an image and more likely that fine image detail will be evident to the user. Storing excessively large graphic image files can be impractical or prohibitive. One solution is to store each desired image as a compressed file, incorporate it within an HTML page and link the pages together to permit "zooming" and "panning". Such files are typically in GIF format or JPEG format being directly supported by most web browsers. Other graphic file formats although desirable or advantageous may require the downloading of a specific helper application often referred to as Web browser plug-ins. A plug-in provides the Web browser with additional functionality necessary to render a coin image compilation from a file format other than GIF or JPEG. In addition, JAVAScript, JAVA applets, Active X controls and the like may be utilized separately or in combination to provide enhanced Web browser functionality. Each of these image delivery systems can be used with the present invention, but various problems are associated with such systems; e.g., image degradation due to compression losses and slow downloading times.

Another image delivery system suitable for use with the present invention is known as the FlashPix file format by Eastman Kodak Company in collaboration with Hewlett-Packard Company, Live Picture Inc. and Microsoft Corporation. In this format, the original image is stored in the form of multi-resolution image data each containing a plurality of tiled sub-images. The coin image compilation is stored as a set of files in this multi-resolution tiled format for each coin in a database.

Whichever image delivery system is used to implement the present invention, a plurality of images "1" through "N" are linked to provide various views at various degrees of magnification. The "1" through "N" images are arranged to permit a user through a remote terminal to view a coin as the user would if the user held the actual coin. That is in a gross view, as if the coin were held at arm's length, and then in detailed views of every part of the coin, as if different parts of the coins were viewed through loupes of various magnification with particular attention being paid to significant characteristics such as damaged areas, overstrike regions, and mint marks, for example that effect valuation.

The processor 12 of the embodiment illustrated in the FIG. 2 may be a hardware processor, a software processor, or any combination of the two as needed. Preferably, the processor 12 is a processor that is capable of generating Hypertext Markup Language (HTML) pages on-the-fly from the multi-resolution format image data stored on the data storage device 11.

The remote terminals 20a, 20b and 20c represent a plurality of remote terminals connected to the host terminal 10. As discussed above, this connection can be wired, wireless, Intranet, Internet, direct, etc. It is preferred that the connection have sufficient bandwidth to handle the HTML pages generated by the processor at a display rate that is acceptable to the user and to display them on displays 21a, 21b and 21c connected to the respective remote terminals displays 20a, 20b and 20c. It is understood that the method in which the multi-resolution images are passed to the remote terminal for viewing on the display as well as the compression and structure of the compression of these images depends not only on the type of connection, but also on the available bandwidth of the connection. It is also understood that these multi-resolution images may contain textual as well as graphic information corresponding specifically to each encapsulated numismatic item.

Figure 3:
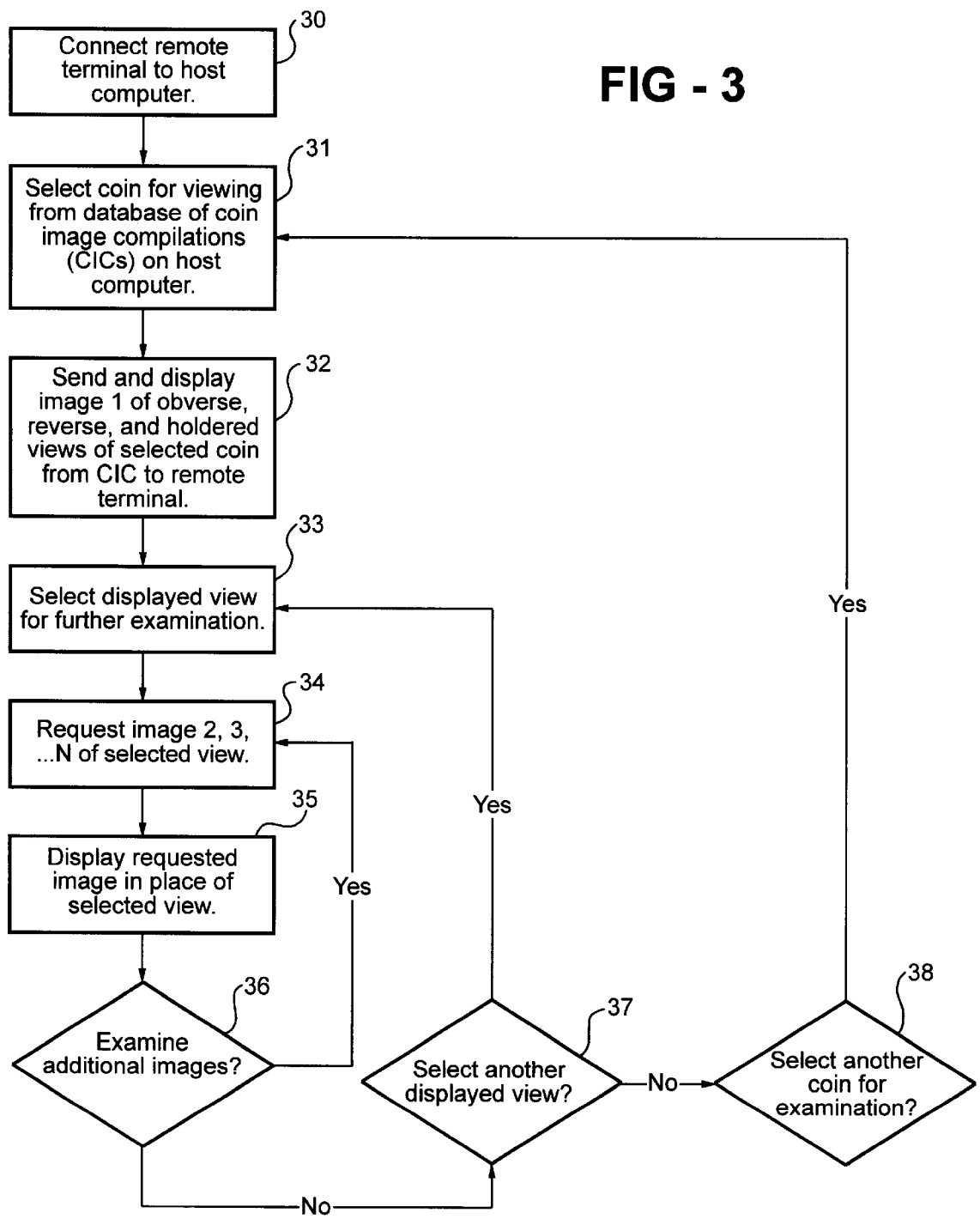
FIG. 3 is a flow chart illustrating the process of the invention.

FIG. 3 is a flow diagram of a method according to the present invention for selectively viewing on the remote terminal 20 coin image compilations that are stored on the data storage device 11 connected to the host computer 10. Each of the coin image compilations stored on the data storage device 11 comprises the images "1" through "N" and can include an obverse view, a reverse view, an obverse holdered view, a reverse holdered view and multiple detail views.

The method of the invention begins at a step 30 by connecting the remote terminal 20 to the host computer 10 in any of the possible ways described above. Currently, the most convenient and inexpensive way to accomplish such connection is via the Internet, but the present invention is in no way limited to an Internet connection. A significant contribution of the ingenuity of the present invention resides in the application of identifying indicia to encapsulated coins. By placing written indication on or sealed within protective coin holders such identifying indicia will provide public notice to consumers that the given encapsulated coin has been processed according to the teachings of the present invention. That is to say, the casual observer being in physical proximity to such an encapsulated coin should be able to recognize at a glance that a given encapsulated coin has its respective Certified Coin Image Compilation stored on the firm's host web server and is available for viewing at any time. Identifying indicia can be conceptualized in any number of ways or variations. For example, engraving into the surface of an existing encapsulated coin holder the World Wide Web address (URL) where visual and textual documentation can be located. Similarly, another method may be the application of identifying indicia by etching the URL through a stencil. A less preferred and less permanent method would be through the application of an adhesive label. With respect to coins which have yet to be encapsulated, third party grading and encapsulation firms could simply include such identifying indicia on the existing "certificate" or elsewhere being then safely sealed within the plastic holder. Yet another method available to at least one third party grading firm would be the opportunity to further differentiate CCIC encapsulated coins by using a plastic insert of a different color in combination with any of the aforementioned Web address (URL) identifying indicia variations. Ultimately, this aspect of the present invention is intended to provide a permanent physical indication that a given encapsulated coin has a measure of "added market value" associated with it, namely a Certified Coin Image Compilation residing in "Cyberspace" and accessible via an AInternet Web browser. Furthermore, this feature of the present invention provides a direct bridge between the CCIC encapsulated coin and a specific host computer, thereby providing users with a straightforward means of connectivity.

Once a user has connected the remote terminal 20 to the host computer 10, in a next step 31 the user selects a coin for view from a database listing the coin image compilations on the host computer. The database can consist of a list of coins, description, grade, and price, for example and can be similar to an offer list as it appears in coin publications for sight unseen purchases. Such a list may additionally include thumbnails of each of the coins. A hyperlink, for example on the thumbnail may serve as the entry point for a buyer to begin a visual review of the coin image compilation. Typically, selecting the hyperlink i's accomplished via a mouse click, but can additionally or alternately include selection via a keyboard command, voice command, etc. If the coin is certified, the selection can be associated with the unique certification number incorporated in the coin holder.

Figure 15:
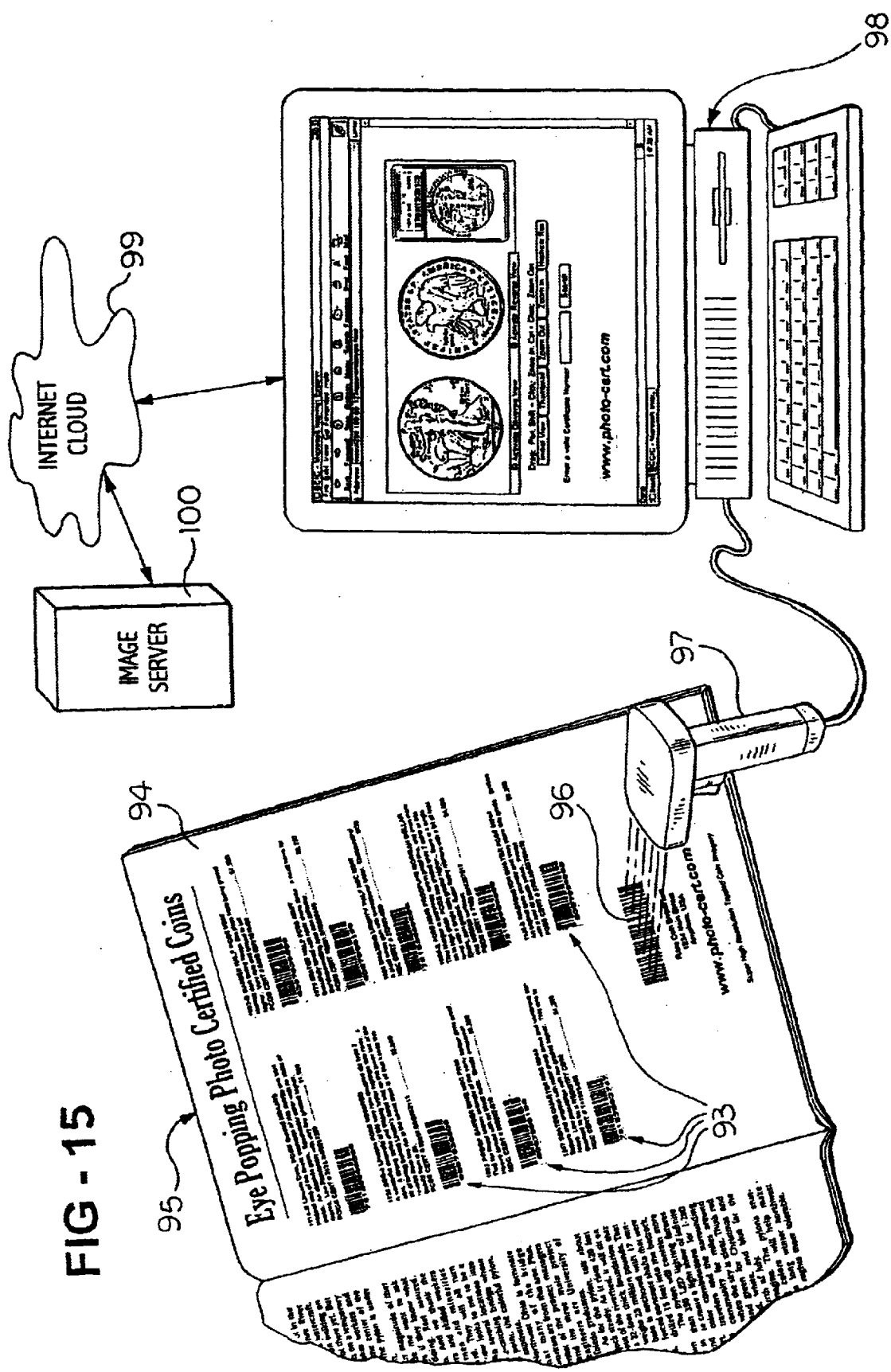
FIG. 15 is a schematic representation of a system according to the present invention for utilizing an advertisement of the type shown in FIG. 14.

While the present invention has been discussed in the context of a virtual active marketplace operating within a computer network environment such as the World Wide Web component of the Internet, it is understood by those skilled in the art that the method of selection of an encapsulated coin to be viewed can be accomplished in any number of ways. For example, well-known established sellers of numismatic material have traditionally advertised in print publications such as Numismatic News and Coin World. These publications enable sellers to reach a broad yet targeted subscriber base of coin collectors. Nonetheless, the listing of a certificate number or other unique identifying indicia associated with an encapsulated graded coin has heretofore been absent from such print media advertising An alternative embodiment of the present invention includes selection methods where the retrieval of trusted imagery is facilitated by the publication of associated certificate numbers or other unique identifying indicia using known forms of printed numismatic advertising. FIG. 14 illustrates how providing an associated certificate number along with the description, grade and price of the certified coin can enhance a typical numismatic print advertisement. Additionally and alternatively, the selection and retrieval of trusted imagery relating to certified coins can be accomplished by scanning an appropriately configured bar code with a hand held bar code scanner as shown in FIG. 15.

Once the selection signal is sent to the host computer 10, the host computer signals the processor 12 (if necessary) which mediates the transfer of image data from the data storage device 11 in a step 32. The processor 12 could, for example, generate an HTML page on the fly from this data. Preferably, the initial image sent from the host computer 10 to the remote terminal 20 contains a gross overview of the selected coin. Also, it is preferred that the initial HTML page sent from the host computer to the remote terminal for display contain an obverse view, a reverse view, and a holdered view as shown in the FIG. 4.

Having viewed the displayed coin images on the remote terminal 20, a user can select one of the views for further examination in a step 33. Selection, as mentioned above, may be made using a keyboard, mouse click, voice command, etc. or combination thereof. When a user selects a view for further examination, the remote terminal 20 sends a signal to the host computer 10 to request the associated image in a step 34. That is, the remote terminal 20 sends a signal to the host computer 10 to request the one of the stored images "2" through "N" that is related to the selected view. This image can for example show a portion of the view at greater magnification. While the images "2" through "N" are all related to image "1" in some way, there is no limitation as to which image a user can request for viewing and while it might be most logical to view the images in a sequence such as increasing magnification, the sequence of selecting views for further examination can be completely random, and the user is of course free to return to image "1" at any time. In response to the request from the remote terminal 20, the host computer 10 sends the requested image to the remote terminal, and replaces the selected image with the requested image in a step 35. Alternatively, the requested image could be opened in an additional viewport.

If the user wishes to examine another related image, the method branches at "Yes" in a decision point 36 loop back to the step 34. If the user wishes to select a different displayed view, the method branches at "No" in the decision point 36 and at "Yes" in a decision point 37 to loop back to the step 33. Finally, if the user wishes to select images of a different coin, the method branches at "No" in the decision point 37 and at "Yes" in a decision point 38 to loop back to the step 31.

The FIGS. 4–10 depict a representative HTML page 40 as it would be appear on a display of the remote terminal 20 in the present invention. More specifically, the remote terminal 20 renders.the HTML page 40 on a Web browser as an HTML page with each view displayed in an independent viewport 41, 42 and 43. In the FIGS. 4–10, each viewport 41 contains an obverse view, each viewport 42 contains a reverse view, and each viewport 43 contains an obverse holdered view. A reverse holdered view could be provided in another viewport to the right of the viewport 43.

Figure 4:
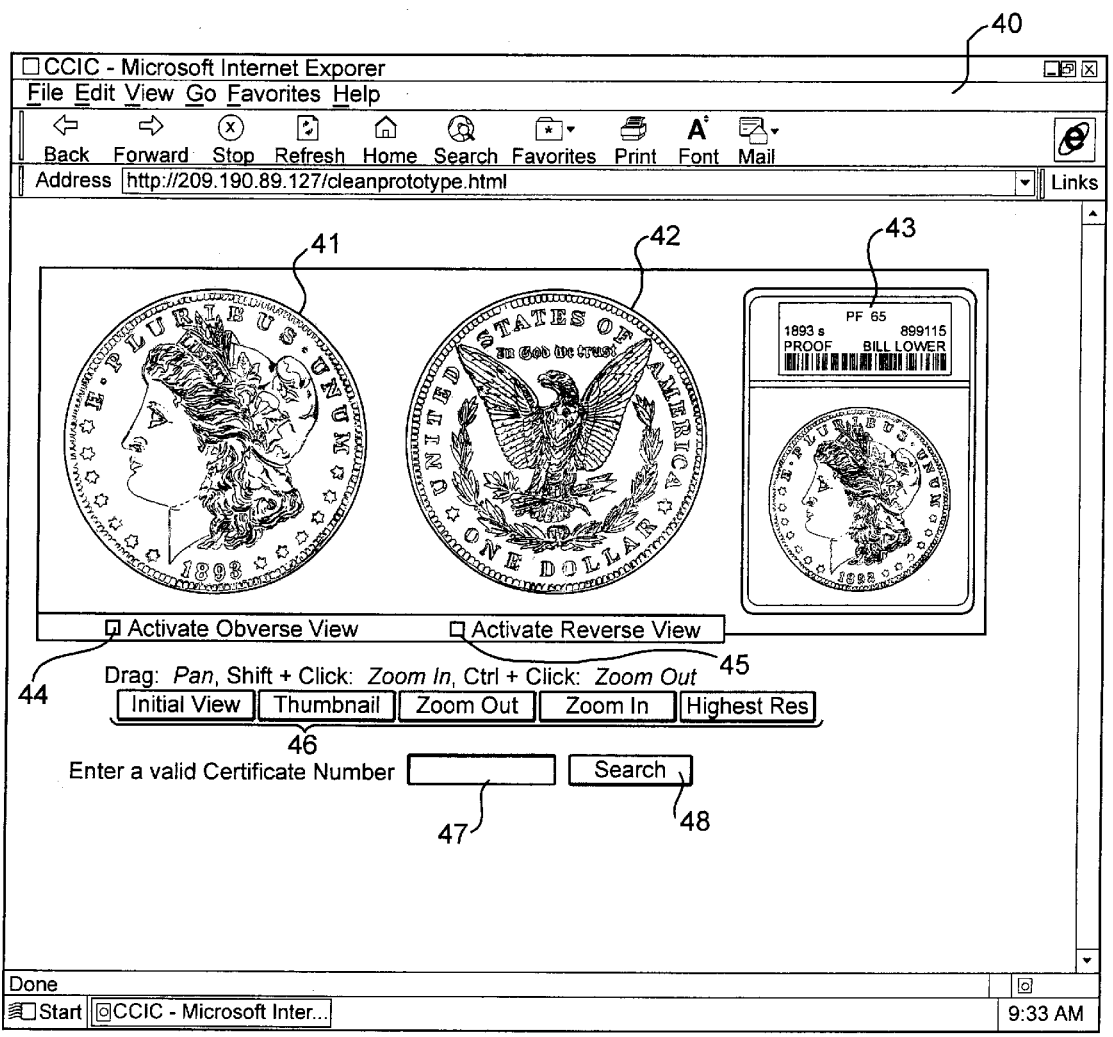
FIG. 4 is a representation of a computer screen display in accordance with an embodiment of the present invention-showing a front view and a rear view of a coin and a view of the encapsulated coin (also referred to as obverse, reverse, and holdered views respectively)

The FIG. 4 shows a gross overview of the entire coin in each viewport. This is the virtual equivalent of how an interested party (referred to herein generically as a "user") might begin looking at an encapsulated coin at a coin show or dealer's shop. The image in the viewport 43 provides the certification information including the coin denomination, the grade and the certification number.

If the user, having made a cursory examination of the coin, decides to continue examining the coin, any one of the three displayed views can be selected and an additional related image obtained from the host computer (step 33 in the FIG. 3). In the embodiment illustrated in the FIG. 4, additional images are available only for the obverse view 41 and the reverse view 42, with the holstered view 43 presented only for reference. Of course, additional images could be offered for the obverse holdered view, and/or additional viewports could be presented on the HTML page to permit the simultaneous viewing of different images of the same view for comparison purposes.

In the FIG. 4, the user clicks on a check box 44 "Activate Obverse View" or on a check box 45 "Activate Reverse View" to select one of the viewports 41 and 42 respectively. Clicking on an empty check box inserts a "checkmark" to activate the associated function. Clicking on a checked check box deletes the "checkmark" to deactivate the associated function. Selecting a view to examine in greater detail activates a plurality of control buttons 46 for navigating through all the related images that comprise the coin image compilation for the selected view. In FIGS. 4–10, the control buttons 46 are labeled from left to right "Initial View", "Thumbnail", "Zoom Out", "Zoom In", and "Highest Res[olution]". Additionally, appearing above the control buttons 46 are instructions for using the mouse and the keyboard to navigate through related views: "Drag: Pan, Shift+ Click: Zoom In, Ctrl+ Click: Zoom Out". These buttons and control combinations are representative and are in no way intended to limit the present invention. The present invention includes any keyboard, mouse, etc. commands that permit a user to navigate through the images of a coin image compilation.

The display 40 shown in the FIG. 4 is selected by entering a certificate number in an information box "Enter a valid Certificate Number" 47 and then actuating an adjacent "Search" button 48. The remote terminal 20 sends the certificate number information to the host computer 10 to search for the associated images in the storage device 11.

Figure 5:
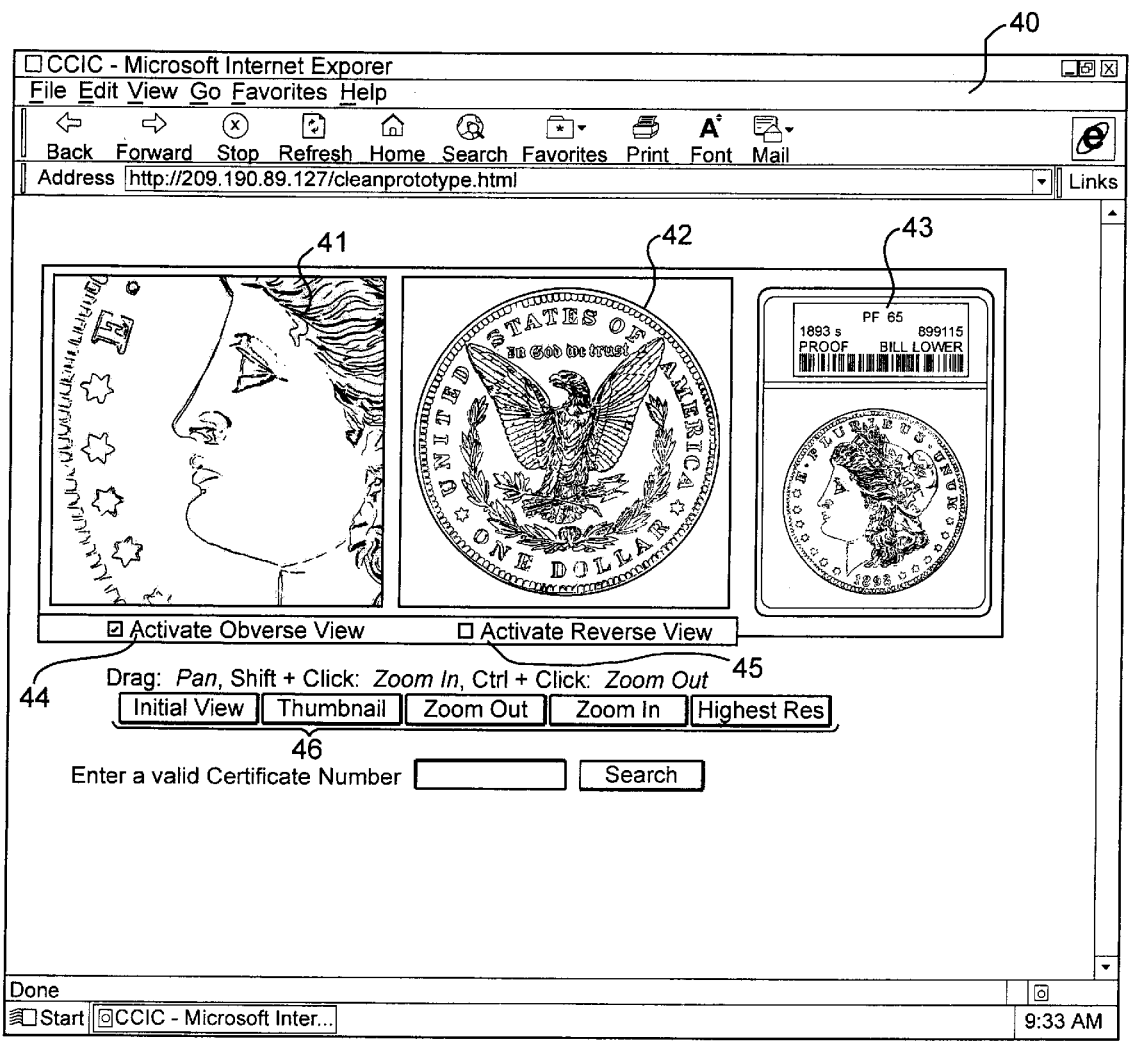
FIG. 5 is a representation of a computer screen display in accordance with the invention showing an enlarged obverse view compared to FIG. 4.

The FIG. 5 illustrates an enlarged portion of the obverse view as displayed in the first viewport 41 on the display of the remote terminal 20. To get this enlarged view, the user selected the "Activate Obverse View" box 44 and one of the control buttons 46 using the mouse/keyboard. In response, the remote terminal 20 formulated a request for an enlarged portion of the Obverse View viewport 41 that was sent to the host computer 10 (step 34 of the FIG. 3). The host computer 10 then located the image requested in the coin image compilation stored on the data storage device 11, and sent it to the first viewport 41 to replace the original image shown in the FIG. 4 per step 35 of the FIG. 3. The steps of repeatedly selecting a view (or both views-see, steps 36, 37, 38 of the FIG. 3) to manipulate and manipulating and comparing these views as desired are shown in the FIGS. 6–10.

Figure 6:
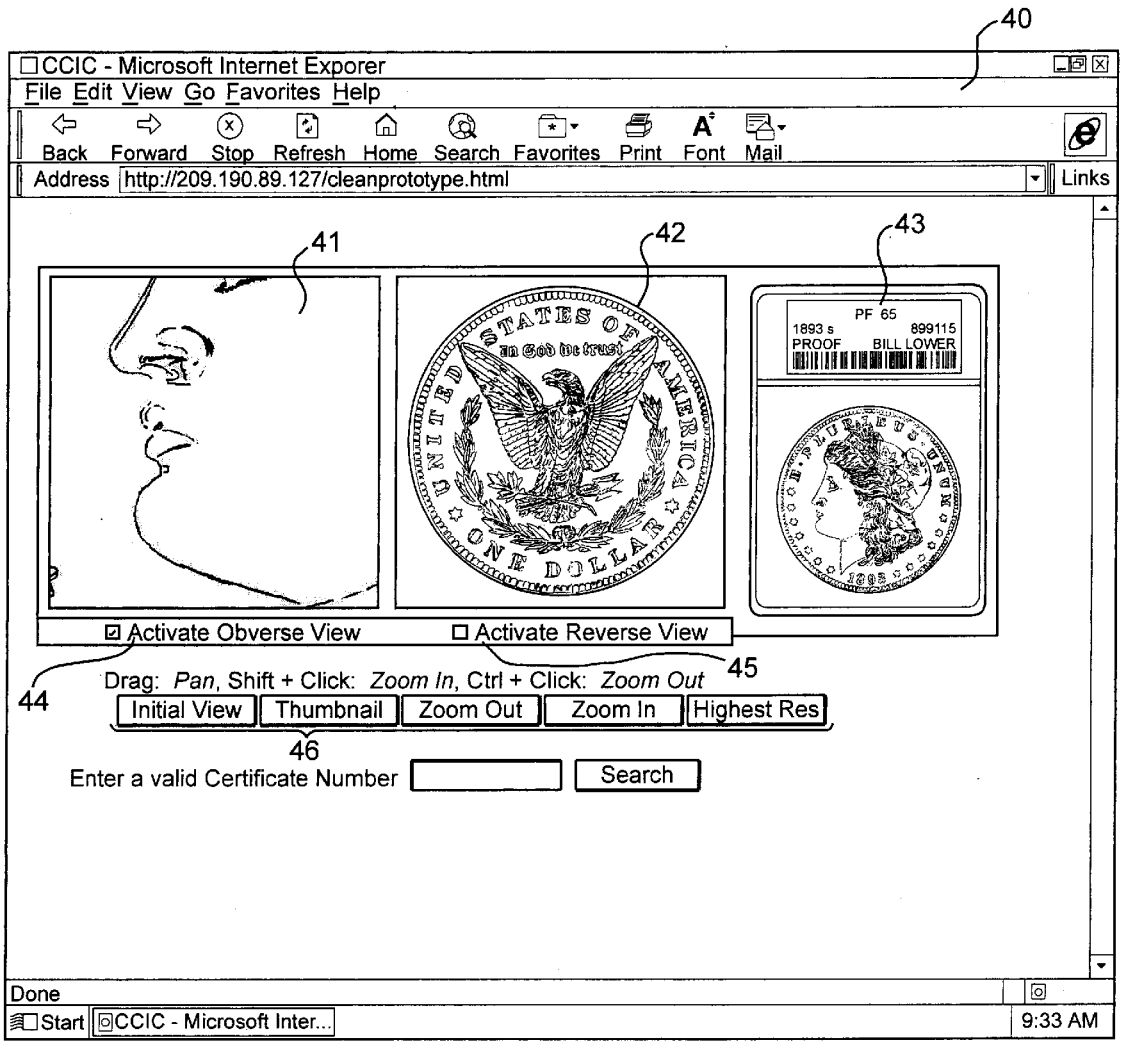
FIG. 6 is a representation of a computer screen display in accordance with the invention showing an enlarged obverse view compared to FIG. 5.
Figure 7:
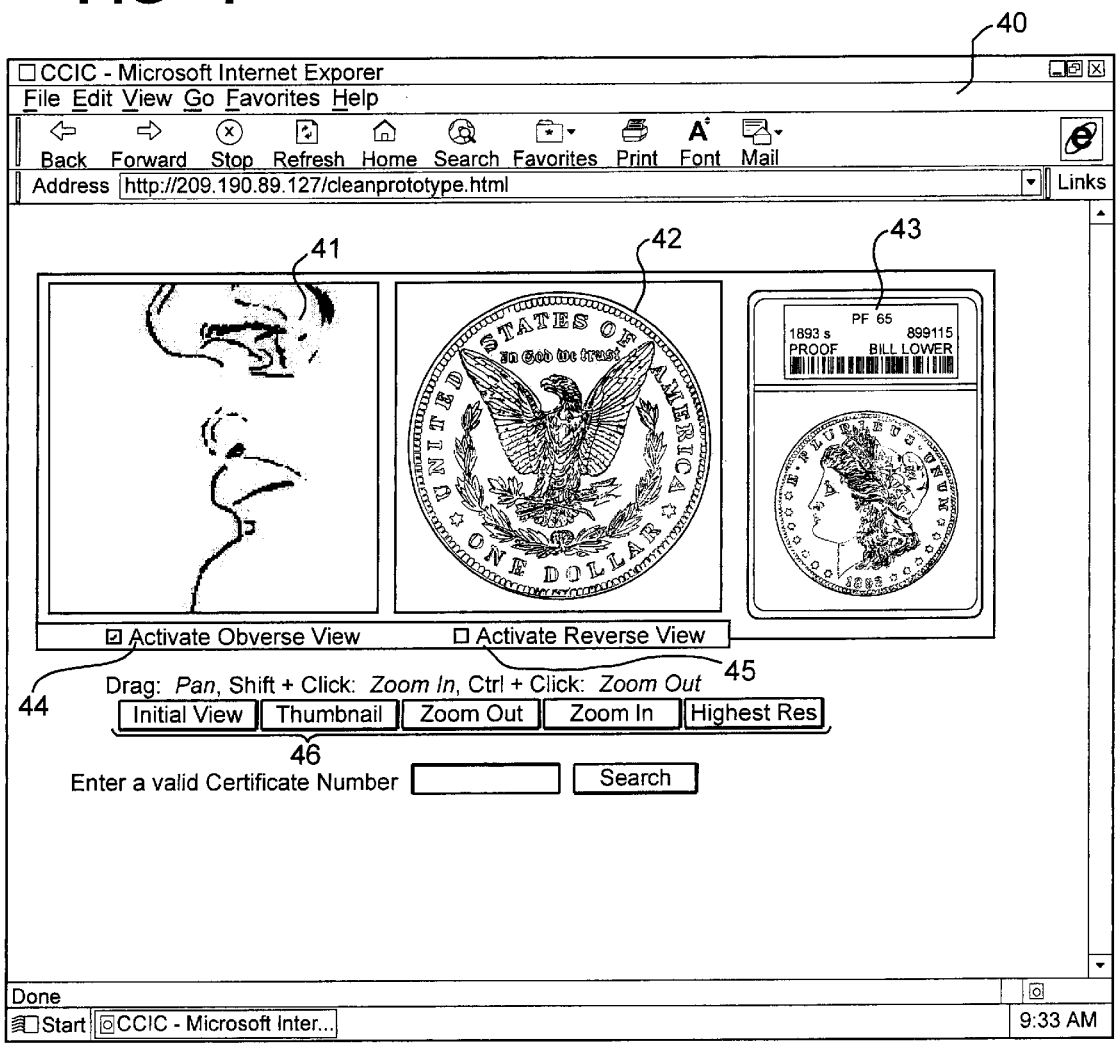
FIG. 7 is a representation of a computer screen display in accordance with the invention showing an enlarged obverse view compared to FIG. 6.

More specifically, the FIG. 6 represents a further step in examining the obverse view. That is, the "Activate Obverse View" box 44 is still checked, and the user has manipulated the mouse/keyboard to "zoom in" further on the Obverse View viewport 41. The FIG. 7 illustrates the results of the user manipulating the mouse/keyboard to "zoom in" still further on the obverse view. While not illustrated, the user may also pan over the surface of the coin in a manner analogous to moving the stage of a microscope under an objective lens to select other portions of the coin for magnification. In the illustrated embodiment, panning the image in the viewport is accomplished by dragging the pointer across the image as instructed above the control buttons 46.

Figure 8:
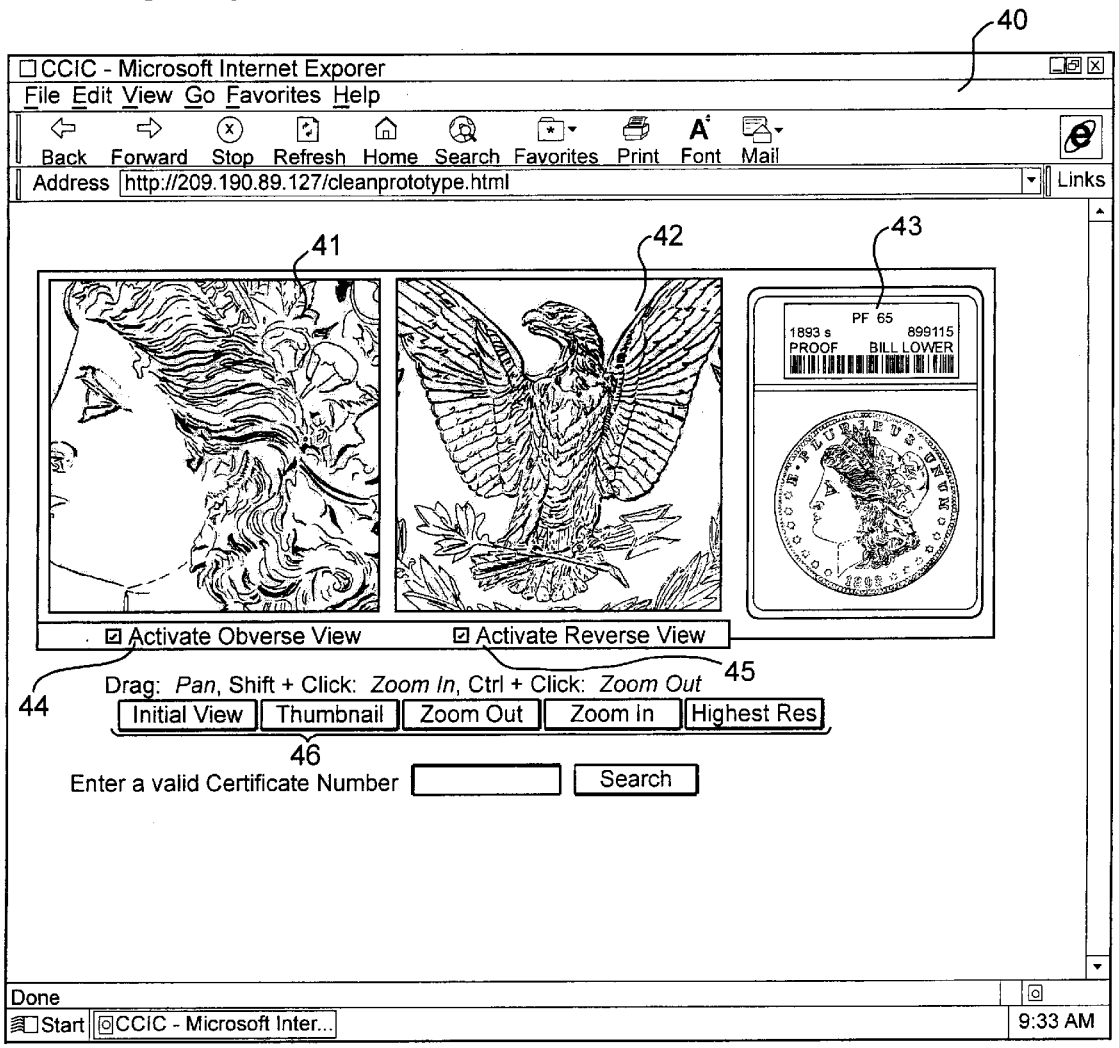
FIG. 8 is a representation of a computer screen display in accordance with the invention showing an enlarged obverse view and an enlarged reverse view compared to FIG. 4.
Figure 9:
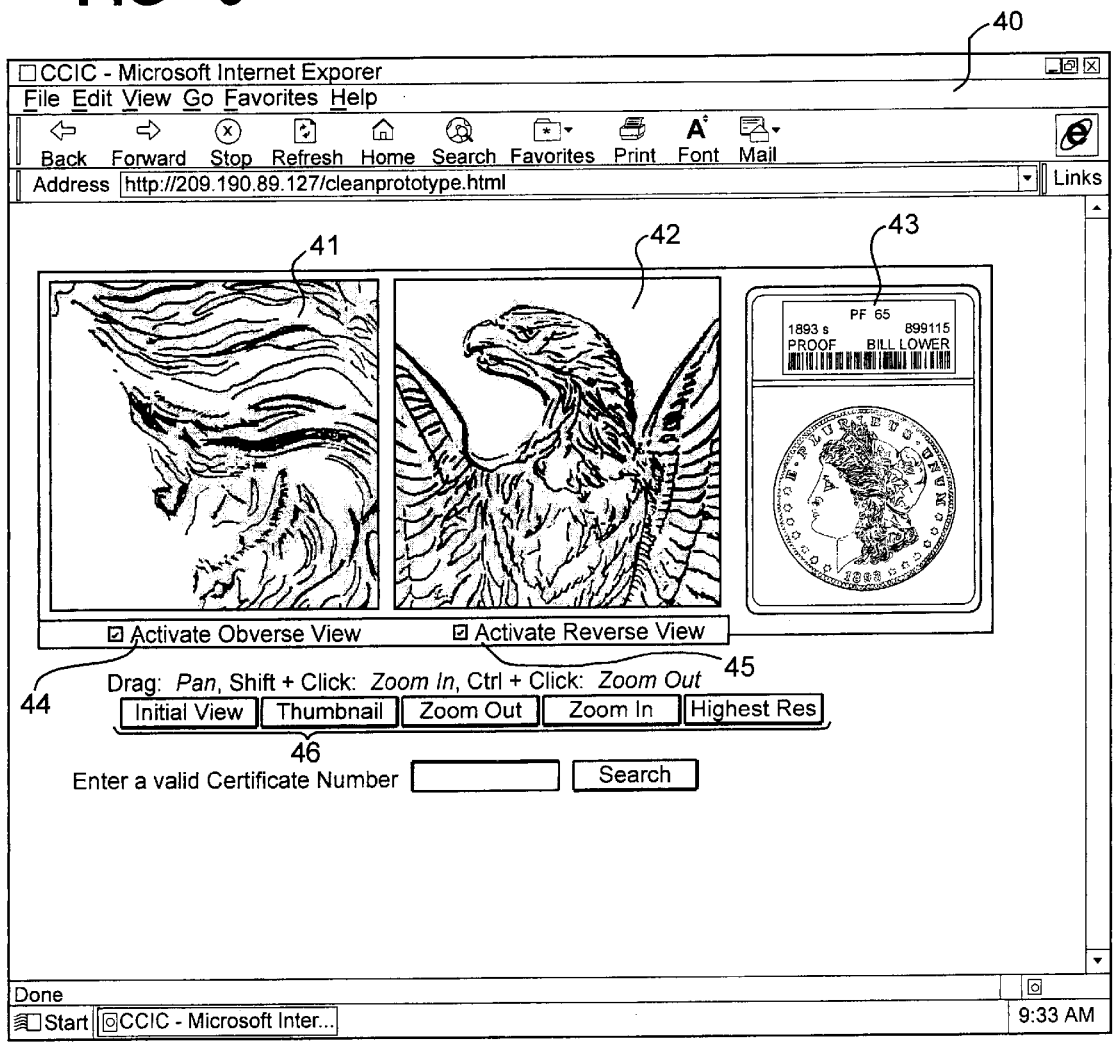
FIG. 9 is a representation of, a computer screen display in accordance with the invention showing an enlarged obverse view and an enlarged reverse view compared to FIG. 8.
Figure 10:
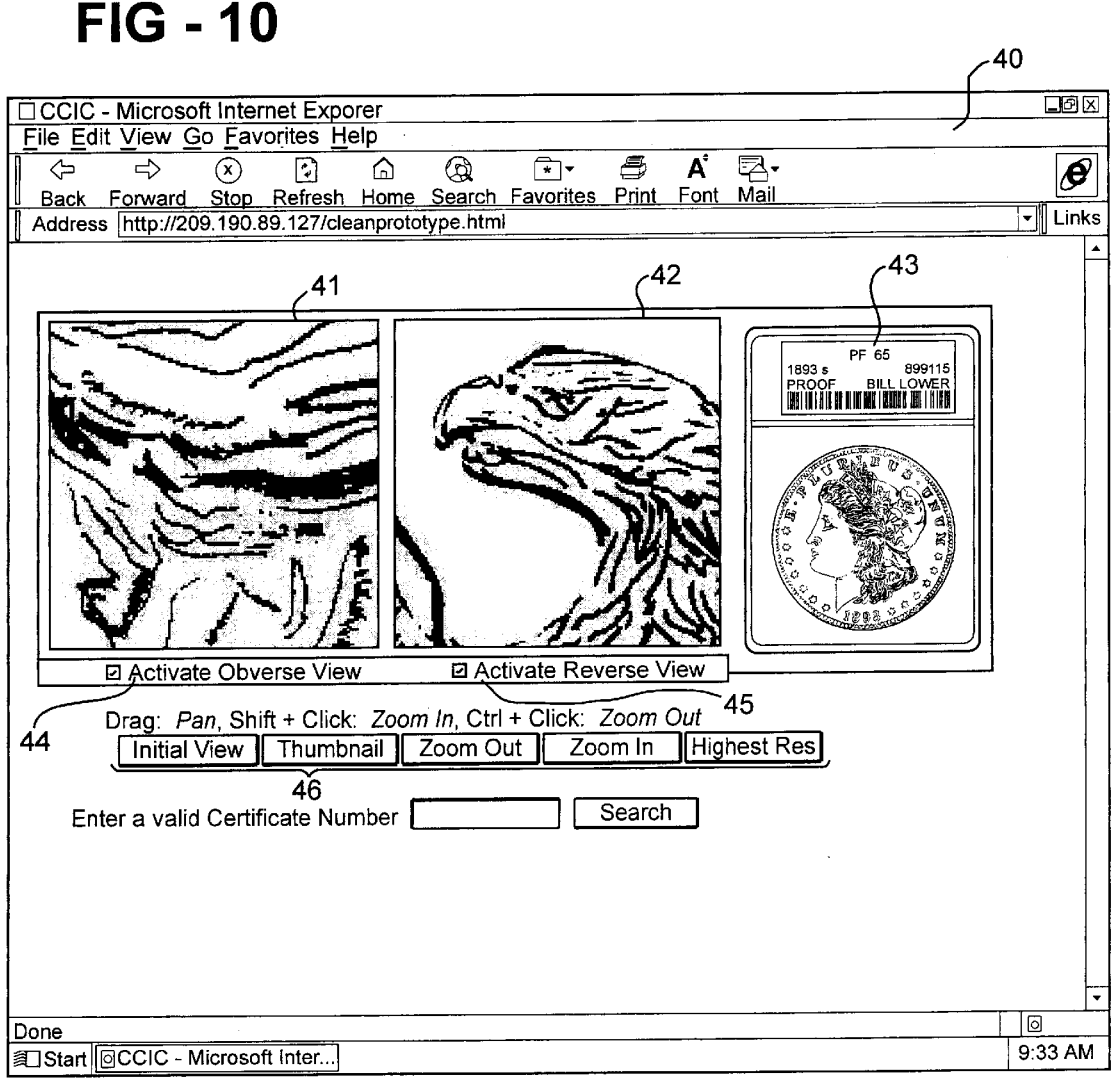
FIG. 10 is a representation of-a computer screen display in accordance with the invention showing an enlarged obverse view and an enlarged reverse view compared to FIG. 9.

The FIG. 8 illustrates a situation where the user has started to examine the obverse view by selecting the "Activate Obverse View" box 44 and obtaining a first degree of magnification, and then decided to examine the reverse view and selected the "Activate Reverse View" box 45. In this embodiment, when both the "Activate Obverse View" box 44 and the "Activate Reverse View" box 45 are selected, whatever control button the user activates effects both viewports. The FIG. 9 and the FIG. 10 illustrate the effect of the user selecting the "Zoom In" button at least twice: both viewports show images of increased magnification. Such a configuration permits a user to rapidly view both sides of the coin simultaneously.

Just as a user might switch the detail of examination of an actual coin from gross to magnified, obverse to reverse, etc. a user of the embodiment of the present invention is free to change views in any viewport limited only by the number of views that constitute the virtual coin made up by the coin image compilation for that coin. In addition, as mentioned above, a user of the present invention can examine the obverse and reverse views side by side, something that is, not physically possible with an actual coin.

The user can view another coin by inserting a certification number in the information box 47 and actuating the "Search" button 48. Thus, if the user wishes to compare the coin just viewed with :a similar coin, the host computer 10 will find the newly identified coin image compilation in the data storage device 11, and instruct the processor 12 to formulate the image in an appropriate manner and return it to the remote terminal 20. Depending on-the embodiment of the invention, viewports for this second coin could be opened directly below the viewports showing the first coin on the same HTML page, or a second (or third, etc.) browser window could be opened containing a copy of the original HTML with viewports for the second coin. While not illustrated, the information box 47 could also permit the user to loop back to search for other comparison coins of the same type, year, grade, price, etc. by integrating with an appropriately configured search engine.

In a further aspect of the invention, if the remote terminal 20 and the host computer 10 are connected via the Internet, the remote terminal can connect to two (or more) host computers each of which is coupled to a data storage device containing different coin image compilations (or additional images for one coin image compilation as discussed below). This would permit the user to compare similar coins, for example, from two different sources such as different dealers or different grading firms. A situation that is completely analogous with viewing similar coins offered by different dealers at a coin show.

It is understood, that in addition to the graphic information of the images of the coin, a coin image compilation may also contain textual information regarding the coin and that this information may be independently searchable.

In addition to individuals wishing to purchase coins on a virtual active marketplace as described herein, the present invention additionally provides a tool for numismatic researchers, having no direct or immediate interest in selling or purchasing coins, to access a host system in order to closely examine coins for personal education, comparative research, or other academic purposes.

Those skilled in the art of HTML programming and HTTP server configuration will readily recognize and appreciate that a number of variations with respect to HTTP server response are possible. For example, one such method is direct transmittal of "static" HTML pages in response to external requests. Whenever a remote terminal asks to view a particular Web page, the HTTP server is responsible for finding the appropriate HTML file and sending its contents back to the requester. In such instances where the appropriate HTML page is resident (fully encoded and immediately available) no additional processing by the server is required. A single coin image compilation can be made up of a number of hyperlinked HTML pages configured so that selecting the "Zoom In" button as illustrated in the FIGS. 4–10 calls the HTML page containing a zoomed image.

In addition, the present invention can use server configuration methods that transmit HTML encoded pages dynamically. Rather than devoting a significant portion of storage media to archive "static" HTML pages, this method permits HTML pages to be generated by the system as needed in response to external requests. Such "on-the-fly," dynamically generated HTML page delivery preferably is based on web-database connectivity software programming techniques. For example, a simple database (.dbf) file or Microsoft Access file can be configured to contain thousands of records, each of which corresponds to a unique coin. A remote user to the Web site of a third party grading firm could enter a certificate number into the box 47 (as illustrated in the FIG. 4) or other identifying or searchable characteristics and press a submit button to transmit this information to the grading firm's HTTP server. Unlike "static" HTML pages, in which the server would handle the request directly, the HTTP server of this embodiment would parse the string containing the certificate number. The parsed string would then be passed as a parameter to a separate CGI (Common Gateway Interface) program or server side API (Application Programming Interface) for processing (illustrated generically as a processor 12 in the FIG. 2). The server side API or CGI program would then write an HTML file on-the-fly, incorporating the appropriate image tags and return control to the HTTP host computer or server 10. The HTTP host computer 10 would then send the contents of the dynamically generated HTML file to the user's browser mounted on the remote terminal 20, and the browser would render the appropriate visual display exactly as if the transmitted file had resided on the server as a "static" Web page.

Presenting coalesced information simultaneously as if all the content of one Web document originated from a single source (host) is a powerful technical feature of the World Wide Web. Likewise, the linking capability inherent within Hypertext Markup Language (HTML) dramatically increases the utility of the World Wide Web by providing nonlinear links to various screen elements such as text, images, sound bites, video clips, etc. It should therefore be readily evident to Web site authors and HTML programmers that the display of information on the World Wide Web relating to numismatic items can result from distributed content being simultaneously provided from more than one host computer. Thus, it is preferred that the present invention be configured for use on the World Wide Web, or an Intranet equivalent thereof.

When the present invention is in use via the World Wide Web, not only is it possible for a user to access multiple host computers to view coin image compilations for different coins, it is also possible for a single coin image compilation to be located on different host computers connected to the World Wide Web. This is particularly convenient, for example, when a collector wishes to act as a dealer by putting a coin in his possession on the market. For example, if a coin collector initiates a public auction via an established third party Internet auction service such as eBay (www.eBay.com), the collector (or eBay) can easily embed within the description of the coin, standard HTML reference tags that point to image files stored on a computer or computers other than those controlled by eBay.

At present, a major problem with HTML files that contain embedded graphic files such as ".GIF" or ".JPG" files is that such graphic files can require a discernible-period of time to pass from a host computer to a remote terminal using commonly employed modems with speeds up to 56 K. This amounts to a significant delay that is unsatisfactory.

One method incorporated in the present invention for mitigating this delay is the incorporation of specific program applications (applets) directly from the host computer (Web server) to the remoter terminal (Web browser). Program applications written in the JAVA programming language (JAVA applets) are particularly useful because they run on many types of remote terminals without modification. For example, platform independent JAVA applets can run on both Netscape Communicator and Internet Explorer browsers. Applets execute more elegantly than plug-ins, download quickly, and don't require user intervention.

The present application specifically incorporates the use of at least one program application, such as a JAVA applet or an ActiveX control with each HTML page loaded from the host computer to the remote terminal. Another embodiment of the present invention incorporates a program application such as a JAVA applet or ActiveX control with each viewport.

An additional embodiment of the present invention stores each multi-resolution coin image compilation in a hierarchical, tiled, digital image file format, such as the FlashPix image file format identified above that stores images stored in a hierarchical, tiled, digital format. A format such as FlashPix takes up slightly more storage space (memory), than an image source file such as a TIF file generated by a high-resolution digital camera. The overall size of an FPX file format file is approximately 33% larger than a comparable flat file because the entire resolution pyramid is stored in the image server. Nevertheless, users can quickly preview the entire image at low resolution, zoom in on a portion of an image at a progressively higher resolutions for monitor display, and then download either the zoomed-in portion or the entire image at even higher resolution for photographic-quality printing. This flexibility greatly speeds the time it takes to view and print high-quality images over the Internet, where bandwidth is very limited compared to high-speed networks. FlashPix, therefore, is preferred for use with embodiments of the present invention.

More specifically, FlashPix images are tiled, multi-resolution format images where each image is available in multiple resolutions, each twice as large as the previous level. Each resolution level is divided into square tiles of sub-images of 64×64 pixels. Each tile in the image is independently accessible, so an application can display a viewport of any part of an image without having to load the entire image into memory. The lowest resolution of an image is always level "0", which always fits within a single FlashPix image tile. The present invention can be configured so that level "0" is a thumbnail identifier or the most gross image initially displayed in the HTML page viewport as described above. Further, the FlashPix format permits image elements to be stored by reference so components of a coin image compilation stored in the FlashPix format permits more detailed views to be stored at different locations rather than requiring that they be stored directly within the same coin image compilation file.

It is preferred, that the images making up a coin image compilation be capable of being stored by reference. This permits, for example, the host computer to store gross obverse, reverse, and holdered views in memory while more detailed views are stored on a storage device such as a CD-ROM or DVD disk.

Even with TI lines, cable modems, and satellite modems becoming more popular, the use of applets and/or the use of multi-resolution coin image compilations stored in a hierarchical, tiled, digital image file format are still preferred in order to permit the movement of maximum amounts of data in the minimum amount of time.

In the present invention, it is preferred that a JAVA applet be associated with each viewport to handle accessing and display of hierarchical, tiled, digital image.file format images.

Figure 11:
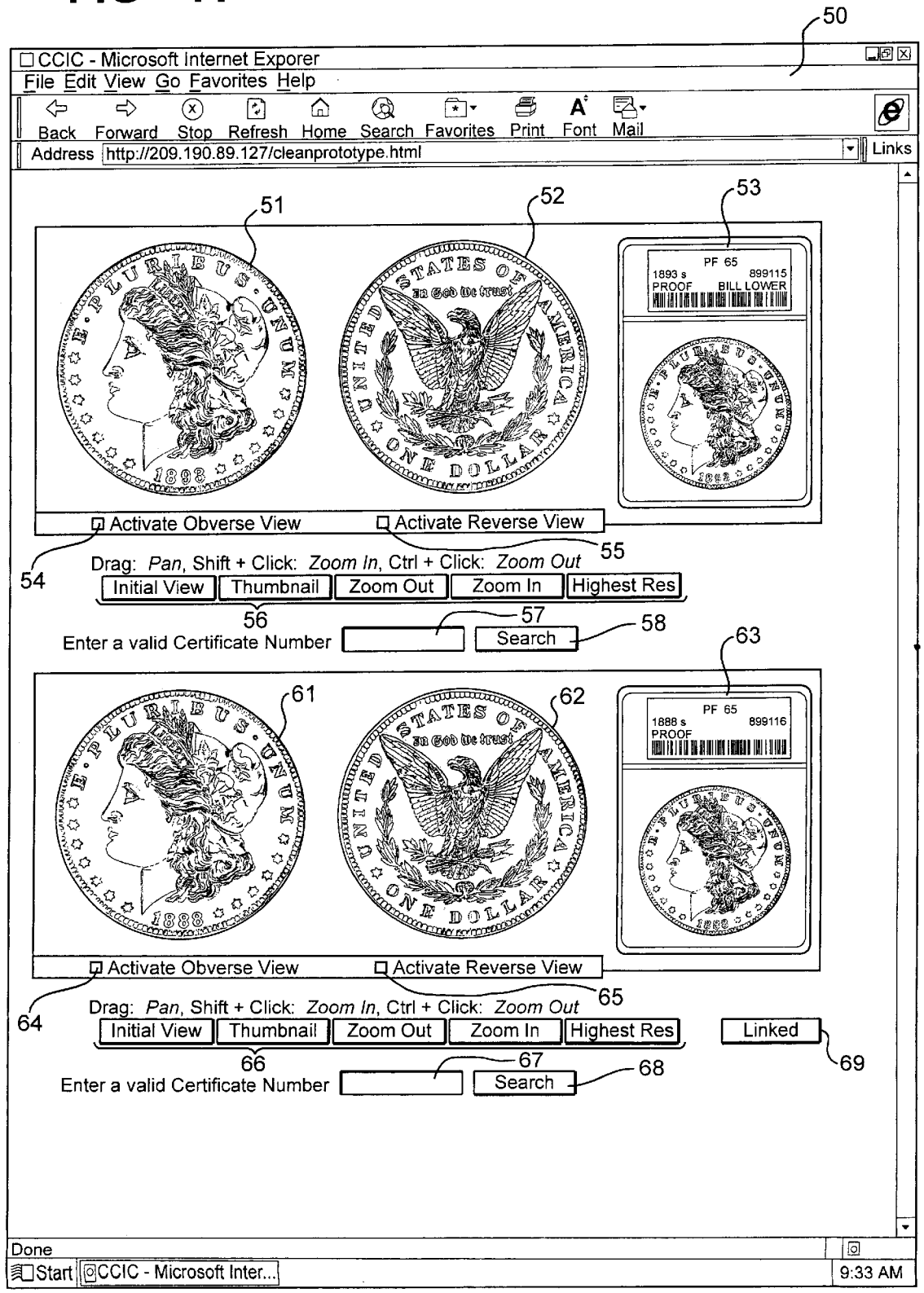
FIG. 11 is a representation of a computer screen display in accordance with an alternate embodiment of the present invention showing two sets of viewports for viewing two coins simultaneously.

The FIG. 11 depicts a representative HTML page 50 similar to the page 40 in the FIG. 4 wherein the reference numerals 51 through 58 correspond to the reference numerals 41 through 48 respectively. However, a second set of viewports 61, 62 and 63 are positioned below the viewports 41, 42 and 43 respectively to provide a means for comparing two coins utilizing corresponding views. A check box 64 "Activate Obverse View", a check box 65 "Activate Reverse View", a plurality of control buttons 66 for navigating through all the related images that comprise the coin image compilation for the selected view, an information box "Enter a valid Certificate Number" 67 and an adjacent "Search" button 68 provide functions similar to those described in connection with the reference numerals 44 through .48. Each of the viewports can be controlled individually, or a "Linked" button 69 can be provided to cause, for example, the check boxes 54 and 55 and the control buttons 56 to control both sets of viewports so that corresponding portions of the two coins are viewed simultaneously at the same magnification.

The FIG. 12 is a block diagram of the present invention configured to facilitate the sight-unseen trading of objects such as exonumia between a first party (a seller) and a second party (a buyer). A third party grading firm maintains a host computer 70 similar to the host computer 10 described above. The computer 70 includes the data storage device 11 and the processor 12 for generating HTML pages of the CCIC's representing coins that have been graded by the firm. The host computer 70 can be connected to an electronic auction house computer 71 maintained by a fourth party to the transaction. The seller can use a seller remote terminal 72 to connect to the auction house computer 71 to list for sale a coin owned by the seller. If the coin was graded by the third party grading firm, the corresponding CCIC is stored in the computer 70. The auction house can list a description of the coin on a web page and link the description to the corresponding CCIC. The buyer then connects a remote terminal 73 to the auction house computer 71 and locates the coin offered for sale. The buyer can view the CCIC for the coin that is available from the host computer 70 through the auction house computer 71. In this manner, the buyer can inspect the coin utilizing images that were generated and maintained by the trusted third party grading firm.

Figure 13:
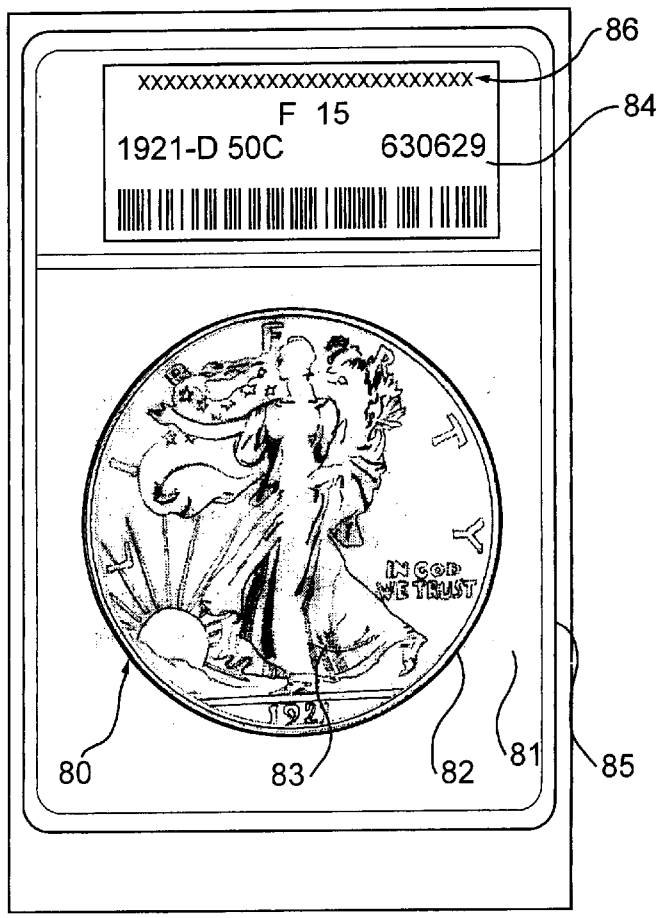
FIG. 13 is a front elevation view of a coin case including identifying indicia utilized with the present invention.

There is shown in the FIG. 13 a typical tamperproof coin case assembly 80 utilized by third party grading firms. The assembly 80 includes a generally planar coin retainer 81 having an aperture 82 formed through it for retaining a coin 83 such that both sides of the coin are completely visible. A generally planar grading certificate 84 is prepared by the third party grading firm to provide information about the coin 83 such as a grade "F 15", a year and mint "1921-D", a denomination "50C" and a unique certificate number "630629". The retainer 81, the coin 83 and the certificate 84 are then encapsulated in a transparent case 85. The assembly 80 can be traded from seller to buyer with a high degree of confidence in the grade of the coin 83.

The certificate number can either be replaced by or supplemented by a unique identifying indicia 86 that permits locating the associated CCIC and viewing images of the coin 83. During the grading process, the necessary images of the coin 83 are created and stored in the host computer 70 (FIG. 12). The CCIC can be accessed by utilizing an identifying indicia 86 that is a URL. For example, the identifying indicia http://www.tpgs.comiccic/123456.html (where "tpgs.com" is the third party grading firm web site) affixed to the assembly 80 permits the seller to identify the CCIC to the auction house which can link to the CCIC in the host computer for viewing by the buyer. The identifying indicia 86 can be applied to: the retainer 81, the grading certificate 84, the interior of the case 85 before encapsulation, or the exterior of the case 85 after encapsulation by any suitable method such as printing or engraving. The identifying indicia 86 can serve as both the certificate number and the database locator whether or not the coin has a certificate number associated with it. All of this information can be reproduced in bar code form as shown in FIG. 13 for reading by automatic scanning equipment.

In FIG. 14 there is illustrated a printed numismatic advertisement 90 having a plurality of blocks of descriptive material including a block 91 related to a description, grade, certificate number and price of a particular certified coin. Adjacent to the block 91 is a printed bar code 92 that can be scanned utilizing a standard bar code scanner. As shown in FIG. 5, a plurality of descriptive blocks with associated bar codes 93 are printed on an advertisement page 94 of a numismatic publication 95. At the bottom of the advertisement there is printed a web site address and corresponding bar code 96 for the advertiser. A potential customer can utilize a hand held bar code scanner 97 connected to a computer 98 to send the scanned bar code over the Internet 99 to a host computer such as an image server 100. Once connected to the web site, the potential buyer can scan in the bar code associated with any of the advertised coins to obtain trusted graphical data in the form of images of the coin.

While the present invention has been discussed in the context of numismatic material, it will be understood to those skilled in the art that it may be used to create a virtual market for any commodity that involves certified products that buyers would like to have the opportunity to examine prior to purchase such as stamps, sports trading cards, collectable documents (such as letters and stock certificates), etc.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method performed by a marketplace computer for electronically trading graded objects over a network between a plurality of interconnected remote computers including seller computers, buyer computers and at least one trusted image hosting computer, the method comprising the steps of:
   a) receiving a first transmission of data over the network from a first seller computer, the received data relating to a first graded object offered for sale, the first graded object having a tamperproof uniquely assigned identifying indicia for effectuating the retrieval of at least one trusted image associated with the first graded object, the first transmission of data including a description of the first graded object and information related to the seller of the first graded object;
   b) responding to the first transmission of data received from the first seller computer the marketplace computer generates a unique graphical and textual presentation format relating to said first graded object offered for sale, stores the data in a predetermined manner on a data storage means operatively connected to the marketplace computer and provides the plurality of buyer computers access across the network to the first graded object presentation format; and
   c) responding to a first request from a first buyer computer the marketplace computer transmits a predetermined presentation format across the network to the requesting first buyer computer and in response to said first request from said first buyer computer the marketplace computer effectuates the transmission of at least one trusted image associated with the graded object, the trusted one image being served by a trusted third party image-hosting computer.

2. The method according to claim 1 wherein the graded objects offered for sale are encapsulated graded objects each having a tamperproof uniquely assigned identifying indicia for effectuating the retrieval of at least one trusted image associated with the encapsulated graded object.

3. The method according to claim 1 wherein step a) is performed by including with the first data transmission information specifying a first uniquely assigned identifying indicia for effectuating the retrieval of at least one trusted image of the first graded object.

4. The method according to claim 1 wherein the unique identifying indicia assigned to each graded object is an assigned unique UTRL.

5. The method according to claim 1 wherein step a) is performed by including with the first data transmission a first Universal Resource Locator (URL) referencing a trusted third party image hosting computer for serving at least one trusted image uniquely assigned to the first graded object.

6. The method according to claim 1 wherein the marketplace computer is an auction house marketplace computer and the presentation format is am auction lot presentation format.

7. The method according to claim 1 wherein the graded objects are one or more of coins, stamps, trading cards and documents.

8. The method according to claim 1 wherein the one trusted image hosting computer is operated by a trusted third party grading firm.

9. A method for electronically trading an encapsulated graded object comprising the steps of:
   a storing at least one image of an encapsulated graded object in a database, the one image having characteristics permitting details of the object upon which the graded object was graded to be viewed on a video display means, the encapsulated graded object having a tamperproof assigned associated unique identifying indicia;
   b) connecting the database with a first computer, the first computer being responsive to the identifying indicia for retrieving the one image;
   c) providing to a second computer a description of the object and information related to an owner of the object and the description to the one image in the database;
   d) connecting the first computer with the second computer, the second computer being accessible by at least one potential buyer from a remote terminal connected to the second computer; and
   e) providing to the one potential buyer at the remote terminal the description of the object and, in response to a request by the one potential buyer, sending a selected one image in the database from the first computer through the second computer to the remote terminal for viewing by the one potential buyer.

10. The method according to claim 9 including a step of storing a bid on the object by the one potential buyer and providing the bid to the owner at another remote terminal connected to a third computer.

11. The method according to claim 9 wherein the assigned associated unique identifying indicia is an assigned associated unique URL and step a is performed by connecting the database with a first computer, the first computer being responsive to the assigned associated unique URL for retrieving the said one image.

12. The method according to claim 9 wherein said step a) is performed by storing the said one image as a hierarchical, tiled, multi-resolution digital image.

13. The method according to claim 9 wherein the encapsulated graded objects are one or more of coins, stamps, trading cards and documents.

14. A Certified Image Compilation System for selectively displaying a plurality of trusted images uniquely assigned to graded objects, the graded objects being visually examined utilizing at least one of the trusted images by a plurality of potential buyers having access to an electronic marketplace trading in said graded objects, the system comprising:
   a host computer;
   a data storage device operatively connected to said host computer and storing data as a Certified Image Compilation representing a plurality of images related to a an encapsulated graded object to be visually examined, the images having characteristics permitting details of the object upon which the object was graded to be viewed, said images including a gross image of the graded object and at least one magnified image associated with the gross image said encapsulated graded object being assigned a unique identifying indicia in a tamperproof manner;
   a remote computer having network access to the host computer; and
   a display means connected to said remote computer for accessing visual data whereby when a potential buyer inputs requests, said host computer responds to said requests by sending image data from said data storage device to said display means to display said gross image of said graded object in response to a first one of said requests and by sending image data from said data storage device to said display means to display one of said magnified images in response to a second one of said requests.

15. The system according to claim 14 wherein the graded objects are encapsulated graded coins and said plurality of images associated with each encapsulated graded coin includes an obverse gross view and a reverse gross view of said encapsulated graded coin and in response to a first one of said requests said display means displays the obverse and reverse gross view side-by-side forming a combined gross view display.

16. The system according to claim 15 wherein said combined gross view display includes a plurality of views having various degrees of magnification and said display means displays selected ones of said magnified views in response to a second one of said requests.

17. The system according to claim 14 wherein the graded objects are encapsulated graded coins and said plurality of images includes an obverse view gross image and a reverse view gross image of said encapsulated graded coins and said display means has a plurality of side-by-side viewports and in response to a first one of said requests said display means displays said obverse view gross image and said reverse view gross image simultaneously in separate ones of said viewports.

18. The system according to claim 17 wherein said images include a first plurality of images of various degrees of magnification of selected portions of said obverse view gross image and a second plurality of images of various degrees of magnification of selected portions of said reverse view gross image and in response to a second one of said requests said display means displays selected ones of said magnified images individually in corresponding ones of said viewports.

19. The system according to claim 14 wherein the graded objects are encapsulated graded objects and said data storage device stores a unique certification number relating to the encapsulated object and whereby when the certification number is transmitted to said host computer as an input request from a potential buyer, said host computer sends image data from said data storage device to said display means to display at least one image of the encapsulated graded object, said one image showing the encapsulated graded object with said certification number.

20. The system according to claim 14 wherein said host computer is an HTTP host computer, said display means is in a remote terminal connected to said host computer through the Internet and including a processor in said HTTP host computer that generates successive dynamic HTML pages on-the-fly from said data stored in said data storage device and streams said dynamic HTML pages to said remote terminal as requested by said remote terminal each said dynamic HTML page representing a different one of said images.

21. The system according to claim 14 wherein said images are hyperlinked HTML pages.

22. The system according to claim 14 wherein said images are tiled multi-resolution format images.

23. An e-commerce system enabling a plurality of potential buyers to visually examine representations of a plurality of encapsulated graded objects being advertised for sale, the system comprising:

a published document;

a host computer;

a remote computer having network access to the host computer;

a display means operatively connected to the remote computer; and a data storage device operatively connected to said host computer and storing trusted graphical data representing a plurality of encapsulated graded objects to be visually examined, the trusted graphical data having characteristics permitting details of the objects upon which the objects were graded to be viewed, said data storage device storing a unique identifying indicia assigned to each encapsulated graded object in a tamperproof manner and whereby when the uniquely assigned identifying indicia is transmitted to said host computer as an input request from a potential buyer, said host computer sends trusted graphical data from said data storage device to said display means for viewing by said potential buyer.

24. The system according to claim 23 wherein the published document is a printed advertisement offering encapsulated graded objects for sale.

25. The system according to claim 24 wherein the printed advertisement carries uniquely assigned identifying indicia relating to said encapsulated graded objects for sale thereby providing potential buyers the information necessary for initiating input requests to the host computer to effectuate the retrieval of trusted graphical data from said storage device.

26. The system according to claim 25 wherein the disclosed uniquely assigned identifying indicia associated with an advertised encapsulated graded object for sate is a uniquely assigned certificate number, each certificate number having a predetermined format for effectuating the retrieval of trusted graphical data from said storage device.

27. The system according to claim 25 wherein the disclosed uniquely assigned identifying indicia associated with an advertised encapsulated graded object for sale is a uniquely assigned URN, each URL having a predetermined format for effectuating the retrieval of trusted graphical data from said storage device.

28. The system according to claim 23 wherein the system is further comprised of a bar code scanning device operatively connected to said remote computer, the bar code scanning device serving as an input means enabling a potential buyer to initiate a request and effectuate the retrieval of trusted graphical data from said storage device.

29. The system according to claim 25 wherein the disclosed uniquely assigned identifying indicia associated with an advertised encapsulated graded object for sale is an assigned unique machine-readable bar code, each assigned unique machine-readable bar code having a predetermined format for effectuating the retrieval of trusted graphical data from said storage device.

30. The system according to claim 23 wherein the encapsulated graded objects are encapsulated graded coins each having a tamperproof uniquely assigned identifying indicia and when the uniquely assigned identifying indicia is transmitted to said host computer as an input request from a potential buyer, said host computer sends trusted graphical data from said data storage device to said display means to display at least one view of the encapsulated graded coin.

* * * * *